United States Patent
Miyama et al.

(10) Patent No.: US 8,447,878 B2
(45) Date of Patent: May 21, 2013

(54) RECEIVING APPARATUS, TRANSMITTING APPARATUS, COMMUNICATION SYSTEM, AND METHOD OF DETECTING BUFFER SETTING OF RELAY SERVER

(75) Inventors: Seiji Miyama, Kanagawa (JP); Yoshihiko Ikenaga, Tokyo (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 12/409,450

(22) Filed: Mar. 23, 2009

(65) Prior Publication Data

US 2009/0240832 A1 Sep. 24, 2009

(30) Foreign Application Priority Data

Mar. 24, 2008 (JP) .................. P2008-075915

(51) Int. Cl.
*G06F 15/16* (2006.01)
(52) U.S. Cl.
USPC ........................... 709/234; 709/232; 709/233
(58) Field of Classification Search
USPC ......................................... 709/234, 232, 233
See application file for complete search history.

(56) References Cited

U.S. PATENT DOCUMENTS

| | | | | |
|---|---|---|---|---|
| 6,119,167 A | * | 9/2000 | Boyle et al. | ............ 709/234 |
| 2003/0217173 A1 | | 11/2003 | Butt et al. | |
| 2005/0038903 A1 | * | 2/2005 | Venemans | ............ 709/234 |
| 2007/0025342 A1 | * | 2/2007 | Obata | ............ 370/352 |
| 2007/0276954 A1 | | 11/2007 | Chan et al. | |

FOREIGN PATENT DOCUMENTS

| | | |
|---|---|---|
| JP | 2-200040 | 8/1990 |
| JP | 4-333155 | 11/1992 |
| JP | 2001-94625 | 4/2001 |
| JP | 2004-128671 | 4/2004 |
| JP | 2005-525656 | 8/2005 |
| JP | 2006-211015 | 8/2006 |
| WO | WO 2005-002175 | 1/2005 |

OTHER PUBLICATIONS

European Search Report from corresponding application No. EP 09003973 dated Apr. 6, 2010.

* cited by examiner

*Primary Examiner* — Adnan Mirza
(74) *Attorney, Agent, or Firm* — Finnegan, Henderson, Farabow, Garrett & Dunner, LLP

(57) ABSTRACT

A receiving apparatus of the present invention includes: a relayed dummy data receiving unit for receiving relayed dummy data including dummy data of n bytes (n≧1) and/or dummy data of N bytes (N≧n) sequentially and repetitively transmitted from a transmitting apparatus to a relay server from the relay server; and a buffer setting detecting unit for detecting a buffer setting of the relay server based on a first size value indicative of data size of relayed dummy data received for the first time by the relayed dummy data receiving unit and a second size value indicative of not larger data size of relayed dummy data received for the second time and relayed dummy data received for the third time.

17 Claims, 15 Drawing Sheets

RECEIVING APPARATUS, TRANSMITTING APPARATUS, COMMUNICATION SYSTEM, AND METHOD OF DETECTING BUFFER SETTING OF RELAY SERVER

CROSS REFERENCES TO RELATED APPLICATIONS

The present invention contains subject matter related to Japanese Patent Application JP 2008-075915 filed in the Japan Patent Office on Mar. 24, 2008, the entire content of which being incorporated herein by reference.

BACKGROUND OF THE INVENTION

1. Field of the Invention

The present invention relates to a receiving apparatus, a transmitting apparatus, a communication system, and a method of detecting a buffer setting of a relay server.

2. Description of the Related Art

In recent years, generally, computers connected to a network perform communication via a relay server. Many of such communications are performed using a communication protocol such as the HTTP protocol. A computer performing communication transmits/receives data via a proxy server. A proxy server buffers data on a proxy server based on the setting and relays data transmitted from a transmitting apparatus to a receiving apparatus. In particular, if data whose data size is not clear is transmitted by HTTP tunneling or the like, buffering may occur.

In communications performed via such a proxy server, there is the case that data requiring immediacy such as sound and video images is transmitted/received. In this case, by adding data having a size covering the buffering capacity of the proxy server to the data requiring immediacy and transmitting the resultant data, the data requiring immediacy transmitted from a transmitting apparatus can be immediately received by a receiving apparatus.

Japanese Patent Application National Publication No. 2005-525656 discloses a technique related to a method of automatically detecting a proxy server used by a computer such as a transmitting apparatus or a receiving apparatus on the computer.

SUMMARY OF THE INVENTION

Buffer settings of proxy servers are different from each other and it is difficult to estimate the buffer setting of a proxy server on a transmitting apparatus. Therefore, it is also difficult to estimate data size covering capacity of buffering to be added in the transmitting apparatus in order to assure that data requiring immediacy is received promptly by a receiving apparatus. When the transmitting apparatus adds data unnecessarily having a large data size and transmits data requiring immediacy without estimating buffer setting of a proxy server by the transmitting apparatus, an unnecessary load is applied to a network, and an adverse influence may be exerted on communication performed on the network.

The present invention has been achieved in view of the issues and it is desirable to provide a receiving apparatus, a transmitting apparatus, a communication system, and a method of detecting buffer setting of relay server which are novel and improved, capable of transmitting data requiring immediacy while suppressing load on a network.

According to an embodiment of the present invention, there is provided a receiving apparatus including: a relayed dummy data receiving unit for receiving relayed dummy data including dummy data of n bytes ($n \geq 1$) and/or dummy data of N bytes ($N \geq n$) from a relay server, and the relayed dummy data is sequentially and repetitively transmitted from a transmitting apparatus to the relay server; and a buffer setting detecting unit for detecting a buffer setting of the relay server based on a first size value indicative of data size of relayed dummy data received for the first time by the relayed dummy data receiving unit and a second size value indicative of not larger data size of relayed dummy data received for the second time and relayed dummy data received for the third time.

If each of the first size value and the second size value is n bytes, the buffer setting detecting unit may detect that the relay server has a buffer characteristic in which buffering data is not performed.

The buffer setting detecting unit may detect that the relay server has a buffer characteristic in which buffering a predetermined amount of data is performed only once if the first size value is not n bytes and the second size value is n bytes, and the buffer setting detecting unit may detect that the relay server has a buffer characteristic in which buffering of a predetermined amount of data is performed each time if each of the first and second size values is not n bytes.

The buffer setting detecting unit may detect the first size value as buffer size of the relay server if the first size value is not n bytes and the second size value is n bytes, and detect the first or second size value as buffer size of the relay server if each of the first and second size values is not n bytes.

The receiving apparatus may further include a buffer setting information transmitting unit for transmitting buffer setting of the relay server detected by the buffer setting detecting unit to the transmitting apparatus.

The transmitting apparatus and the receiving apparatus may perform communication by HTTP or HTTPS, the relay server is an HTTP proxy server, the relayed dummy data is transmitted in response to a GET response or a POST request, and information of the buffer setting may be transmitted as response information to the POST request if the relayed dummy data is transmitted in response to the POST request.

According to another embodiment of the present invention, there is provided a transmitting apparatus including: a dummy data transmitting unit for transmitting dummy data of n bytes ($n \geq 1$) and dummy data of N bytes ($N \geq n$) sequentially and repetitively to a relay server, and the relayed dummy data including the dummy data of n bytes and/or the dummy data of N bytes is received by a receiving apparatus, and a buffer setting of the relay server is detected based on size of the relayed dummy data by the receiving apparatus.

The transmitting apparatus may further include: a compensation data size determining unit for determining size d ($d \geq 0$) of compensation dummy data added to transmission data in accordance with the buffer setting of the relay server notified from the receiving apparatus; and a data transmitting unit transmits transmission data with compensation dummy data added thereto, and the compensation dummy data has the size d determined by the compensation data size determining unit.

When the relay server has a buffer setting in which buffering is not performed, the compensation data size determining unit may set size d of the compensation dummy data to be 0.

When the relay server has a buffer setting in which buffering is performed only once, the data transmitting unit may transmit transmission data with compensation dummy added thereto only once.

When the relay server has a buffer setting in which buffering is performed each time, the data transmitting unit may transmit transmission data with compensation dummy data added thereto each time.

The dummy data transmitting unit may dynamically change N each time the dummy data of n bytes (n≧1) and dummy data of N bytes (N≧n) is sequentially and repetitively transmitted.

The transmitting apparatus may further include a storing unit for storing a buffer setting of the relay server received from the receiving apparatus. Based on the buffer setting stored in the storing unit, the compensation data size determining unit may determine size of compensation dummy data, and the data transmitting unit may add compensation dummy data to transmission data.

The transmitting apparatus may further include a detecting unit for detecting that a relay server for relaying communication between the transmitting apparatus and the receiving apparatus is changed. The dummy data of n bytes and the dummy data of N bytes may be transmitted based on a detection result of the detecting unit.

The detecting unit may detect that the relay server is changed using, as a trigger, UP/DOWN of a network interface of the transmitting apparatus or a change of an IP address of the transmitting apparatus.

According to another embodiment of the present invention, there is provided a communication system including a transmitting apparatus having a dummy data transmitting unit for transmitting dummy data of n bytes (n≧1) and dummy data of N bytes (N≧n) sequentially and repetitively to a relay server. The relay server transmits relayed dummy data to a receiving apparatus, the relayed dummy data being obtained by relaying, based on a buffer setting, the dummy data of n bytes and/or the dummy data of N bytes received from the transmitting apparatus, and the receiving apparatus includes: a relayed dummy data receiving unit for receiving the relayed dummy data from the relay server; and a buffer setting detecting unit for detecting a buffer setting of the relay server based on a first size value indicative of data size of relayed dummy data received for the first time by the relayed dummy data receiving unit and a second size value indicative of not larger data size of relayed dummy data received for the second time and relayed dummy data received for the third time.

According to another embodiment of the present invention, there is provided a method of detecting a buffer setting of a relay server for relaying communication between a transmitting apparatus and a receiving apparatus, including the steps of: transmitting dummy data of n bytes (n≧1) and dummy data of N bytes (N≧n) sequentially and repetitively to the relay server by the transmitting apparatus; transmitting relayed dummy data obtained by relaying, based on a buffer setting, the dummy data of n bytes and/or the dummy data of N bytes received from the transmitting apparatus; receiving the relayed dummy data from the relay server by the receiving apparatus; and detecting a buffer setting of the relay server based on a first size value indicative of data size of relayed dummy data received for the first time and a second size value indicative of not larger data size of relayed dummy data received for the second time and relayed dummy data received for the third time.

According to the embodiments of the present invention described above, there are provided a receiving apparatus, a transmitting apparatus, a communication system, and a method of detecting buffer setting of relay server which are novel and improved, capable of transmitting data requiring immediacy while suppressing load on a network.

DETAILED DESCRIPTION OF THE PREFERRED EMBODIMENTS

Figure 1:
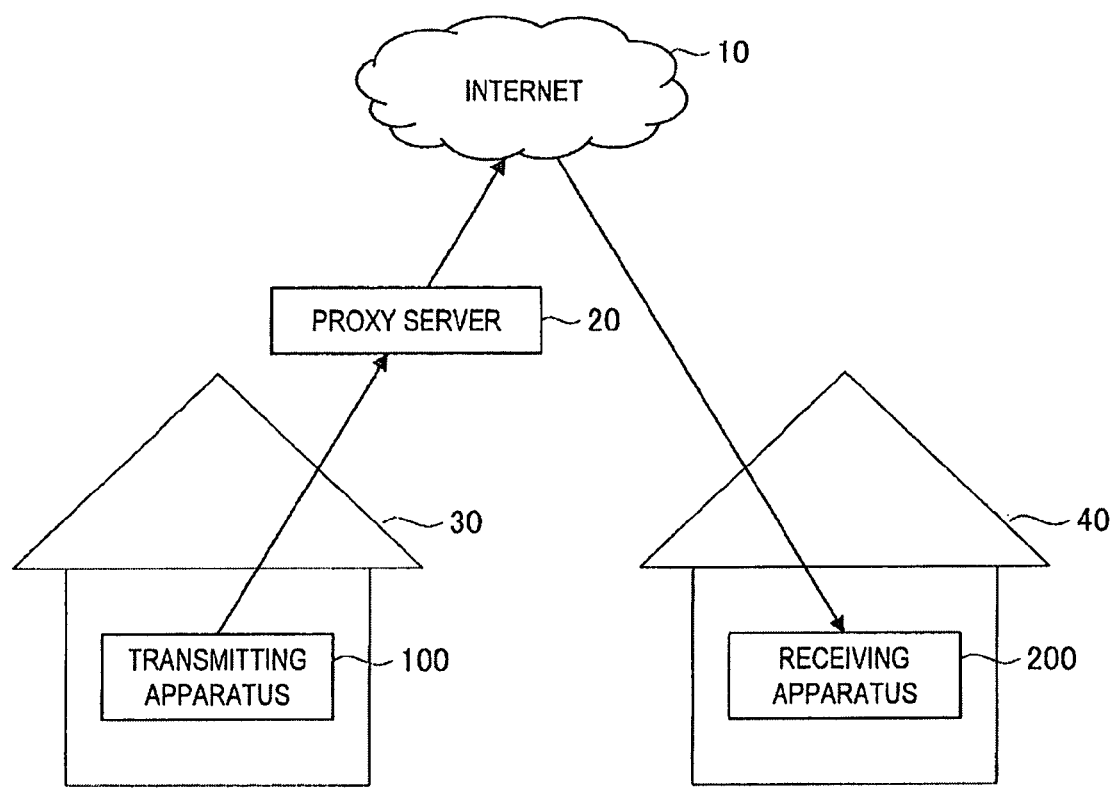
FIG. 1 is a configuration diagram of a network according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)
(Explanation of Network Configuration)

First, a network configuration according to a first embodiment of the present invention will be described. FIG. 1 is a network configuration diagram of the first embodiment of the invention. A transmitting apparatus 100 of the embodiment sequentially and repetitively transmits dummy data of n bytes (n≧1) and dummy data of N bytes (N≧n) to a proxy server 20 as an example of a relay server in order to detect buffer setting of the relay server. The transmitting apparatus 100 is connected to the Internet 10 as an example of a computer network via the proxy server 20.

(Definition of Buffer Settings)

The buffer settings include a buffer characteristic and a buffer size. The buffer characteristic is a characteristic of buffering operation performed when a relay server relays data. The buffer size denotes the size of data buffered on the relay server.

A receiving apparatus 200 of the embodiment receives relayed dummy data from the proxy server 20 and detects the buffer settings of the proxy server 20. The relayed dummy data is the n-byte dummy data and the N-byte dummy data sequentially and repetitively transmitted from the transmitting apparatus, relayed by the proxy server 20, and transmitted to the receiving apparatus. The receiving apparatus 200 is connected to the proxy server 20 via the Internet 10.

The proxy server 20 is an example of the relay server and relays communication between the transmitting apparatus 100 and the receiving apparatus 200. That is, data transmitted from the transmitting apparatus 100 is received by the receiving apparatus 200 via the proxy server 20. The n-byte dummy data and the N-byte dummy data transmitted from the transmitting apparatus 100 is relayed by the proxy server 20, and the relayed dummy data is received by the receiving apparatus 200. The proxy server 20 is connected to the transmitting apparatus 100 and the Internet 10 as an example of the computer network.

In FIG. 1, the transmitting apparatus 100 exists in a home network 30, and the receiving apparatus 200 exits in a home network 40. The transmitting apparatus 100 and the receiving apparatus 200 may exist in the same home network (for example, the home network 30). Although the transmitting apparatus 100 and the receiving apparatus 200 are explained as two apparatuses in the embodiment, the transmitting apparatus 100 and the receiving apparatus 200 may be included in a single communicating apparatus.

The transmitting apparatus 100 and the receiving apparatus 200 can be any computers capable of performing HTTP communication such as personal computers, cellular phones, PDAs, home intelligent appliances conformed with DLNA (Digital Living Network Alliance), AV devices, and the like. The proxy server 20 may be an HTTP proxy server for relaying communication using the HTTP protocol.

(Explanation of Buffer Characteristics of Proxy)

The proxy servers 20 are classified into a plurality of types based on the buffer characteristics. The plurality of types include a proxy server having the buffer characteristic that data is not buffered, a proxy server having the buffer characteristic of buffering a predetermined amount of data only once, and a proxy server having the buffer characteristic of buffering a predetermined amount of data each time. The data relaying operation of the proxy servers of those types will be described below with reference to FIGS. 2 to 4.

(Buffer Characteristic of Buffering No Data)

Figure 2:
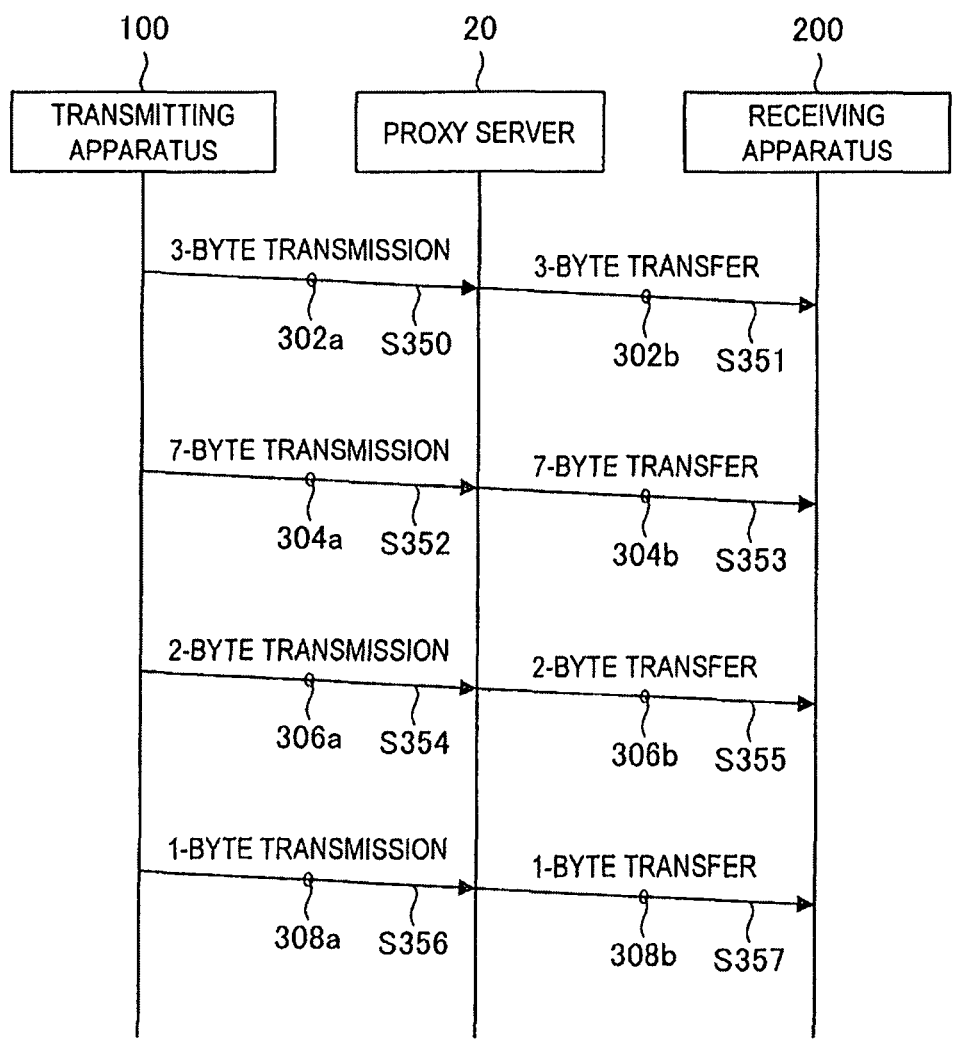
FIG. 2 is a sequence diagram showing an example of buffering operation of a proxy server having a buffer characteristic that data is not buffered.

FIG. 2 is a sequence diagram showing an example of the buffering operation of a proxy server having the buffer characteristic of buffering no data. First, when data 302a of three bytes is transmitted from the transmitting apparatus 100 (S350), the proxy server 20 promptly relays the data and transmits the relayed data 302b to the receiving apparatus 200 (S351). Also in the case where data 304a of seven bytes is transmitted (S352), similarly, the proxy server 20 promptly relays the data and transmits the relayed data 304b to the receiving apparatus 200 (S353). Similarly, when subsequent data 306a of two bytes and data 308a of one byte is transmitted from the transmitting apparatus 100 (S354 and S356), the data is promptly relayed by the proxy server 20 (S355 and S357), the relayed data 306b and 308b is received by the receiving apparatus 200.

(Buffer Characteristic of Buffering Data Only Once)

Figure 3:
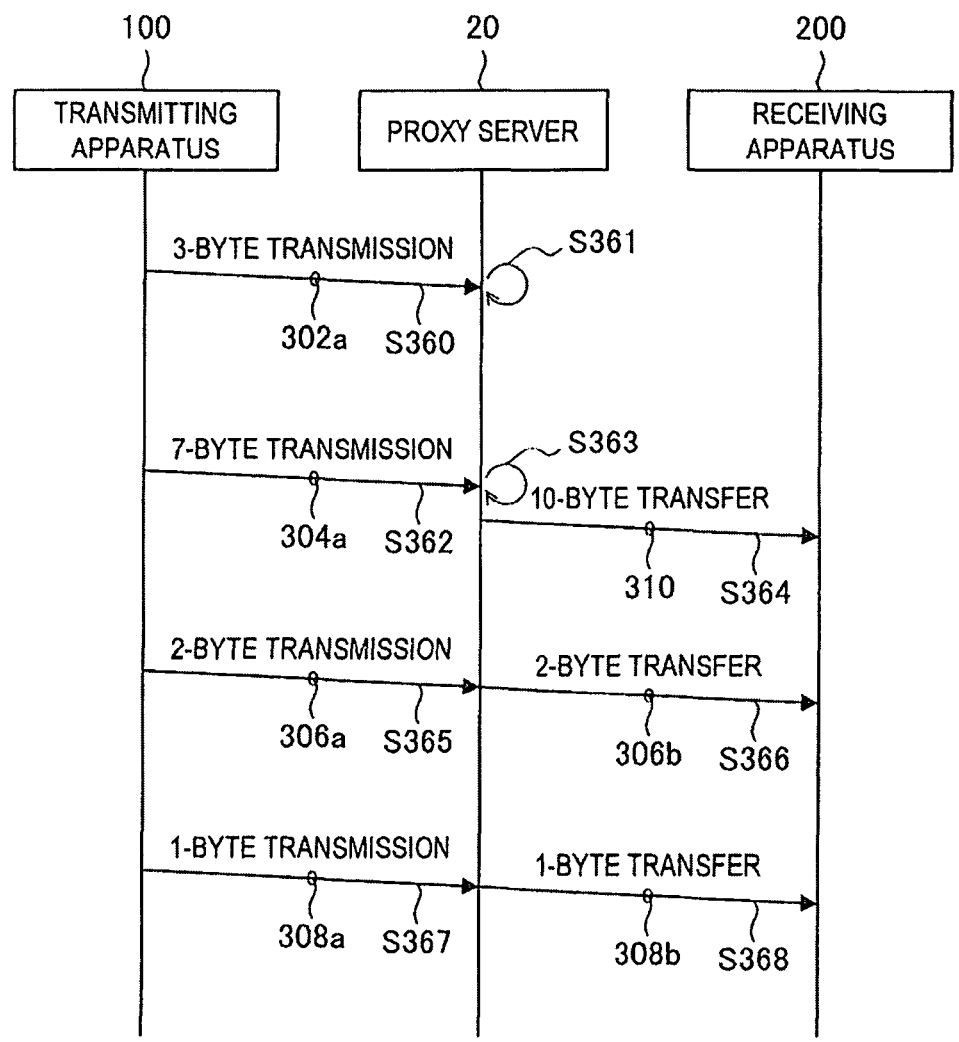
FIG. 3 is a sequence diagram showing an example of the buffering operation of a proxy server having a buffer characteristic of buffering a predetermined amount of data only once.

FIG. 3 is a sequence diagram showing an example of the buffering operation of a proxy server having the buffer characteristic of buffering a predetermined amount of data only once. FIG. 3 shows, as an example, the proxy server 20 whose buffer size is 10 bytes. First, when data 302a of three bytes is transmitted from the transmitting apparatus 100 (S360), the data 302a is received by the proxy server 20 and buffered (S361). Next, when data 304a of seven bytes is transmitted from the transmitting apparatus 100 (S362), the data 304a is received by the proxy server 20 and buffered (S363). The total amount of data buffered on the proxy server 20 becomes 10 bytes, and the buffered data 302a and 304a is transmitted as data 310 of 10 bytes from the proxy server 20 to the receiving apparatus 200 (S364).

Next, when data 306a of two bytes is transmitted from the transmitting apparatus 100 (S365), the proxy server 20 promptly relays the data and transmits the relayed data 306b to the receiving apparatus 200 (S366). Similarly, after that, when data 308a of one byte is transmitted from the transmitting apparatus 100 (S367), the proxy server 20 promptly relays the data, and transmits the relayed data 308b to the receiving apparatus 200 (S368). As described above, after data whose size is equal to or larger than the buffer size is buffered once, also in the case of relaying data whose size is smaller than the buffer size, the proxy server having the buffer characteristic of buffering the predetermined amount of data once promptly relays the data without buffering it.

(Buffering Characteristic of Buffering Data Each Time)

Figure 4:
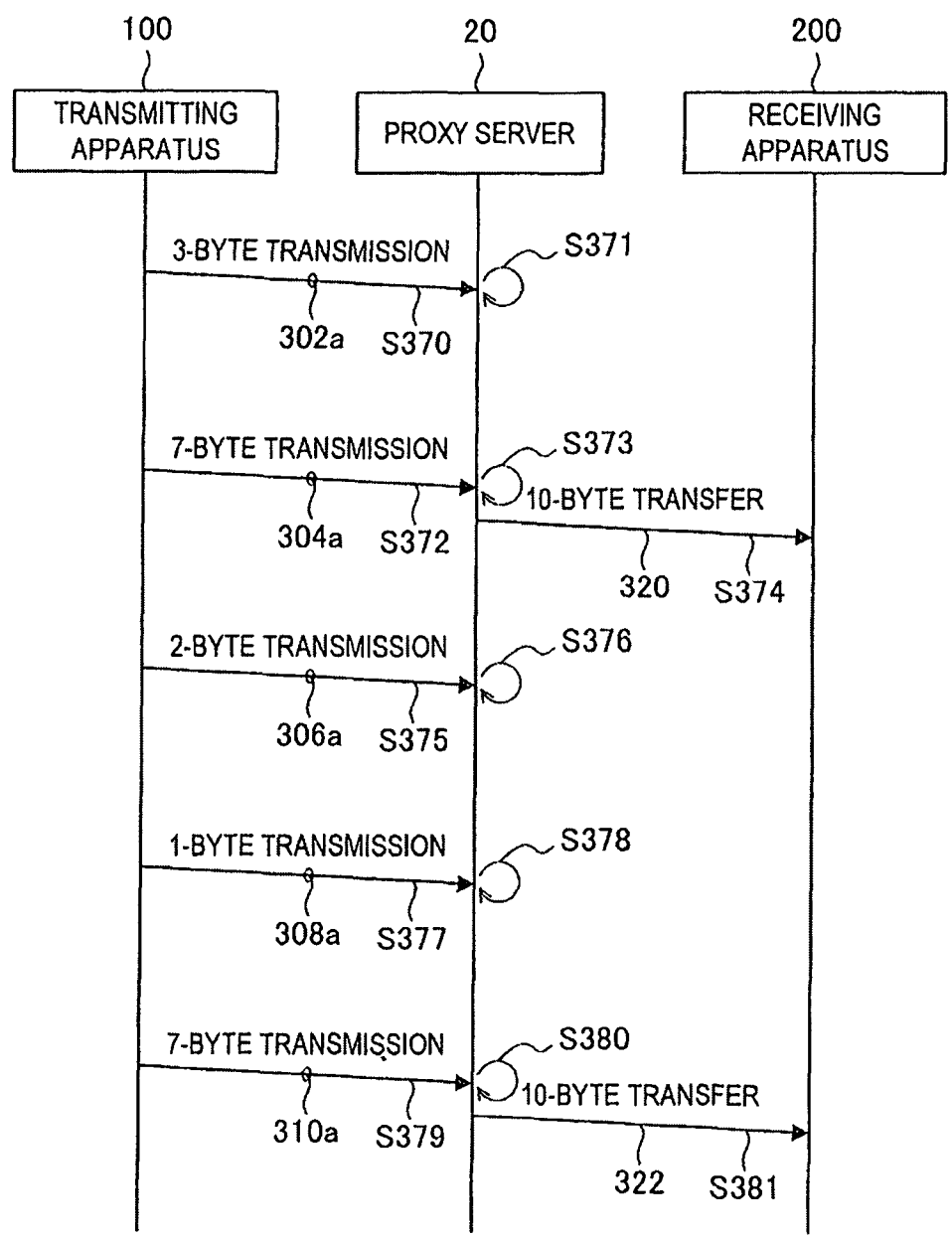
FIG. 4 is a sequence diagram showing an example of the buffering operation of a proxy server having a buffer characteristic of buffering a predetermined amount of data each time.

FIG. 4 is a sequence diagram showing an example of the buffering operation of a proxy server having the buffer characteristic of buffering a predetermined amount of data only once. FIG. 4 shows, as an example, the proxy server 20 whose buffer size is 10 bytes. First, when data 302a of three bytes is transmitted from the transmitting apparatus 100 (S370), the data 302a is received by the proxy server 20 and buffered (S371). Next, when data 304a of seven bytes is transmitted from the transmitting apparatus 100 (S372), the data 304a is received by the proxy server 20 and buffered (S373). The total amount of data buffered on the proxy server 20 becomes 10 bytes, and the buffered data 302a and 304a is transmitted as data 320 of 10 bytes from the proxy server 20 to the receiving apparatus 200 (S374).

Next, when data 306a of two bytes, data 308a of one byte, and data 310a of seven bytes is transmitted from the transmitting apparatus 100 (S375, S377, and S379), in a manner similar to the above, the data 306a, 308a, and 310a is received by the proxy server 20 and buffered (S376, S378, and S380). At this time, the data buffered on the proxy server 20 becomes total 10 bytes, and the data 306a, 308a, and 310a buffered is transmitted as data 322 of 10 bytes from the proxy server to the receiving apparatus 200 (S381).

(Explanation of Transmitting Apparatus)

Figure 5:
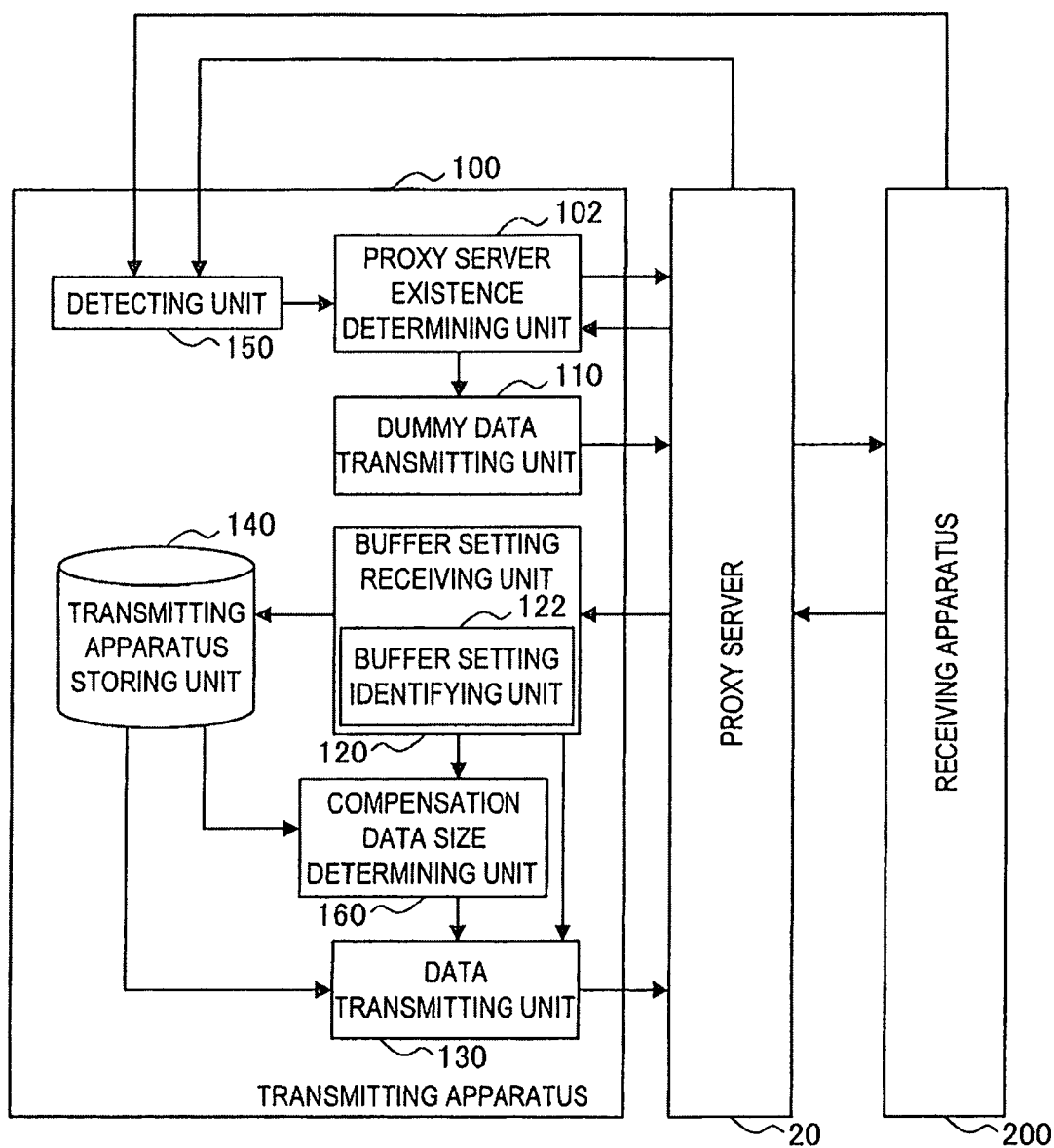
FIG. 5 is a functional block diagram of a transmitting apparatus according to the first embodiment of the invention.

The transmitting apparatus 100 for detecting the buffer settings of the proxy server 20 explained with reference to FIGS. 2 to 4 will be described. FIG. 5 is a functional block diagram of the transmitting apparatus of the embodiment. The transmitting apparatus 100 has a proxy server existence determining unit 102, a dummy data transmitting unit 110, a buffer setting receiving unit 120, a data transmitting unit 130, a transmitting apparatus storing unit 140, a detecting unit 150, and a compensation data size determining unit 160.

(Proxy Server Existence Determining Unit 102)

The proxy server existence determining unit 102 performs pre-process necessary for detecting a buffer setting of the embodiment. More specifically, the proxy server existence determining unit 102 determines the proxy server 20 used at the time of transmitting data from the transmitting apparatus 100 to the receiving apparatus 200 and establishes connection to the receiving apparatus 200 via the determined proxy server 20.

First, the proxy server existence determining unit 102 obtains information of a proxy server set in the transmitting apparatus 100. In the embodiment, the proxy server 20 is set in the transmitting apparatus 100. Next, a process of establishing connection to the receiving apparatus 200 using the proxy server 20 and a process of establishing connection to the receiving apparatus 200 without using the proxy server 20 are simultaneously tried. In the case where a plurality of proxy servers are set in the transmitting apparatus 100, processes of establishing connection to the receiving apparatus 200 using the set proxy servers are simultaneously tried. After that, using a connection established by the trial, the process is performed by the dummy data transmitting unit 110 which will be described later. In the case where a plurality of usable connections are established, the direction connection is preferentially used. In the case where a plurality of usable connections which are not direct connections are established, a connection established via a proxy server which responded fastest is preferentially used. By trying establishment of connections on a plurality of set proxy servers simultaneously in the case of using the set proxy server and in the case of using no proxy server, time for establishing a usable connection can be shortened.

The proxy server existence determining unit 102 also checks the properties other than the buffer settings of the proxy server 20. The properties other than the buffer settings of the proxy server include whether chunk data can be relayed or not and maximum relayable data length. By checking whether chunk data can be relayed or not, data whose data transmission amount total value is unknown by the HTTP tunneling or the like can be transmitted. When chunk data can be relayed, data whose data transmission amount total value is unknown can be transmitted in the chunk form from the transmitting apparatus 100. In the case where chunk data can hardly be relayed, data whose data transmission amount total value is unknown is divided in maximum relayable data length determined by the proxy server existence determining unit 102, and the divided data is transmitted from the transmitting apparatus 100.

(Dummy Data Transmitting Unit 110)

Next, the dummy data transmitting unit 110 will be described. The dummy data transmitting unit 110 is a function unit of sequentially and repetitively transmitting dummy data of n bytes ($n \geq 1$) and dummy data of N bytes ($N \geq n$) every predetermined time intervals of X seconds to the receiving apparatus 200 via the proxy server 20 in order to detect the buffer settings of the proxy server 20. The dummy data transmitting unit 110 transmits the dummy data of n bytes and N bytes using the connection established by the proxy server existence determining unit 102. Herein, n and N are integers. In the embodiment, n is one byte, and N is a fixed value in the range of 1 kilobyte to 10 kilobytes. Therefore, in the embodiment, dummy data is transmitted from the dummy data transmitting unit 110 every X seconds in order of dummy data of one byte, dummy data of N bytes, dummy data of one byte, dummy data of N bytes, . . . .

(Values of n and N)

Although the data size N of dummy data is set in the range from 1 kilobyte to 10 kilobytes, N can be an arbitrary value satisfying $N \geq n$. For example, when the data size n of dummy data is one byte, the data size N of the dummy data may be one byte or 10 megabytes. The smaller the value of N is, more accurate buffer size is detected but it takes time to detect the buffer setting. On the contrary, the larger the value of N is, the shorter time for detecting the buffer setting is, but the buffer size detected is not accurate.

(In the Case where N is Variable)

The data size N of dummy data may be dynamically changed while dummy data of n bytes and N bytes is sequentially and repetitively transmitted. For example, when the data size n of dummy data is one byte, the data size N of dummy data is one byte at the first transmission. The data size N is two bytes at the second transmission, and is four bytes at the third transmission. After that, N may be doubled at each transmission. In this case, data is transmitted from the dummy data transmitting unit 110 in order of dummy data of one byte, dummy data of one byte, dummy data of one byte, dummy data of two bytes, dummy data of one byte, dummy data of four bytes, . . . . In this case, time for detecting the buffer setting is shorter than that in the case where N is fixed to one byte. The detected buffer size is more accurate than that in the case where N is fixed to a very large value (for example, 10 megabytes).

Although the example of transmitting dummy data while doubling the value of N each transmission has been described, the way of changing N is not limited to the above. For example, N is 10 bytes at the first transmission, and 10 bytes may be added to the value of N transmitted last time. Alternatively, N is 5 kilobytes at the first transmission, and the value of N may be halved every transmission. As described above, dummy data is transmitted while dynamically changing the data size N of dummy data and the way of changing is adjusted, thereby enabling detection time and accuracy of the buffer setting to be adjusted.

(Predetermined Time Interval X)

A transmission interval X of transmission of data from the dummy data transmitting unit has to be a value larger than the total of round trip time (RTT) between the transmitting apparatus 100 and the proxy server 20 and round trip time between the receiving apparatus 200 and the proxy server 20. More preferably, the transmission interval X is a value sufficiently larger than the total of round trip time between the transmitting apparatus 100 and the proxy server 20 and round trip time between the receiving apparatus 200 and the proxy server 20. The above is necessary to avoid dummy data of n bytes and N bytes transmitted from the dummy data transmitting unit 110 from being coupled on a network for a reason other than the buffering of the proxy server 20.

The optimum transmission interval X may be determined by, for example, measuring response time from the receiving apparatus 200 when data is transmitted from the transmitting apparatus 100 to the receiving apparatus 200 via the proxy server 20. In this case, data to be transmitted has to be data known as data which is not buffered by the proxy server. The data may be a POST request in which information of "content length" is written in the header. When the POST request is received, the receiving apparatus 200 transmits a response to the received POST request to the transmitting apparatus 100. The transmitting apparatus 100 measures time since the POST request is transmitted until the response to the POST request is received, and can determine the transmission interval X in the dummy data transmitting unit 110.

(Buffer Setting Receiving Unit 120)

The buffer setting receiving unit 120 receives the information of the buffer setting detected by the receiving apparatus 200 via the proxy server 20 from the receiving apparatus 200. The buffer setting receiving unit 120 has a buffer setting identifying unit 122. The buffer setting identifying unit 122 identifies that the received buffer setting information indicates the buffer characteristic of buffering no data, the buffer characteristic of buffering a predetermined amount of data only once, or the buffer characteristic of buffering a predetermined amount of data each time. The buffer setting identifying unit 122 also identifies the buffer size.

The information of the buffer setting received by the buffer setting receiving unit 120 is used to determine the data size of compensation dummy data in the compensation data size determining unit 160. The buffer setting information is also used for determining a timing of adding the compensation dummy data in the data transmitting unit 130. The buffer setting received by the buffer setting receiving unit 120 is stored in the transmitting apparatus storing unit 140. The stored buffer setting may be used for a process in the compensation data size determining unit 160 and the data transmitting unit 130.

(Compensation Data Size Determining Unit 160)

The compensation data size determining unit 160 determines data size d of compensation dummy data based on the buffer size received by the buffer setting receiving unit 120. The compensation dummy data is data having a data size covering buffering capacity, which is added to data in order to assure that data is promptly received by the receiving apparatus 200 at the time of transmitting data requiring immediacy. Based on the data size d of the compensation dummy data determined by the compensation data size determining unit 160, the compensation dummy data is added to transmission data by the data transmitting unit 130.

In the case where the buffer characteristic received by the buffer setting receiving unit 120 is the buffer characteristic of buffering no data, the compensation data size determining unit 160 determines that the data size d of the compensation dummy data is 0. In the case where the buffer characteristic received by the buffer setting receiving unit 120 is the buffer characteristic of buffering data only once, or the buffer characteristic of buffering data each time, the compensation data size determining unit 160 determines the data size d of the compensation dummy data based on the buffer size received by the buffer setting receiving unit 120.

In the above, the case of performing the process in the compensation data size determining unit 160 based on the information of the buffer setting received by the buffer setting receiving unit 120 has been described. The information of the buffer setting used in the compensation data size determining unit 160 may be information stored in the transmitting apparatus storing unit 140.

(Data Transmitting Unit 130)

In the case of transmitting data requiring immediacy, based on the buffer characteristic included in the buffer setting information received by the buffer setting receiving unit 120, the data transmitting unit 130 adds compensation dummy data and transmits the resultant data. In the case where the buffer characteristic received by the buffer setting receiving unit 120 is the buffer characteristic of buffering no data, the data transmitting unit 130 transmits the data requiring immediacy without adding the compensation dummy data.

On the other side, in the case where the buffer characteristic received by the buffer setting receiving unit 120 is the buffer characteristic of buffering a predetermined amount of data only once, the data transmitting unit 130 adds the compensation dummy data having the data size determined by the compensation data size determining unit 160 to the transmission data only once and transmits data requiring immediacy. In the case where the buffer characteristic received by the buffer setting receiving unit 120 is the buffer characteristic of buffering of the predetermined amount of data each time, the data transmitting unit 130 adds the compensation dummy data having the data size determined by the compensation data size determining unit 160 every transmission of data requiring immediacy and transmits the resultant data.

By adding compensation dummy data based on the buffer characteristic, the network load applied due to the addition of the compensation dummy data can be decreased. Although the case of performing the process in the data transmitting unit 130 based on the information of the buffer setting received by the buffer setting receiving unit 120 has been described, the information of the buffer setting used in the data transmitting unit 130 may be information stored in the transmitting apparatus storing unit 140.

(Transmitting Apparatus Storing Unit 140)

The transmitting apparatus storing unit 140 stores the buffer setting received by the buffer setting receiving unit 120. The information of the buffer setting stored in the transmitting apparatus storing unit 140 is used to determine the data size d of the compensation dummy data by the compensation data size determining unit 160. The information of the buffer setting stored in the transmitting apparatus storing unit 140 is also used for addition of compensation dummy data to the data requiring immediacy in the data transmitting unit 130.

(Detecting Unit 150)

The detecting unit 150 detects that the proxy server 20 for relaying communication between the transmitting apparatus 100 and the receiving apparatus 200 is changed. The change of the proxy server 20 may be detected using, for example, UP/DOWN of the network interface of at least one of the transmitting apparatus 100, the proxy server 20, and the receiving apparatus 200, or a change of the IP address as a trigger. When a change is detected by the detecting unit 150, a connection is established by the proxy server existence determining unit 102, and dummy data of n bytes and N bytes is transmitted from the dummy data transmitting unit 110.

(Explanation of Receiving Apparatus)

Figure 6:
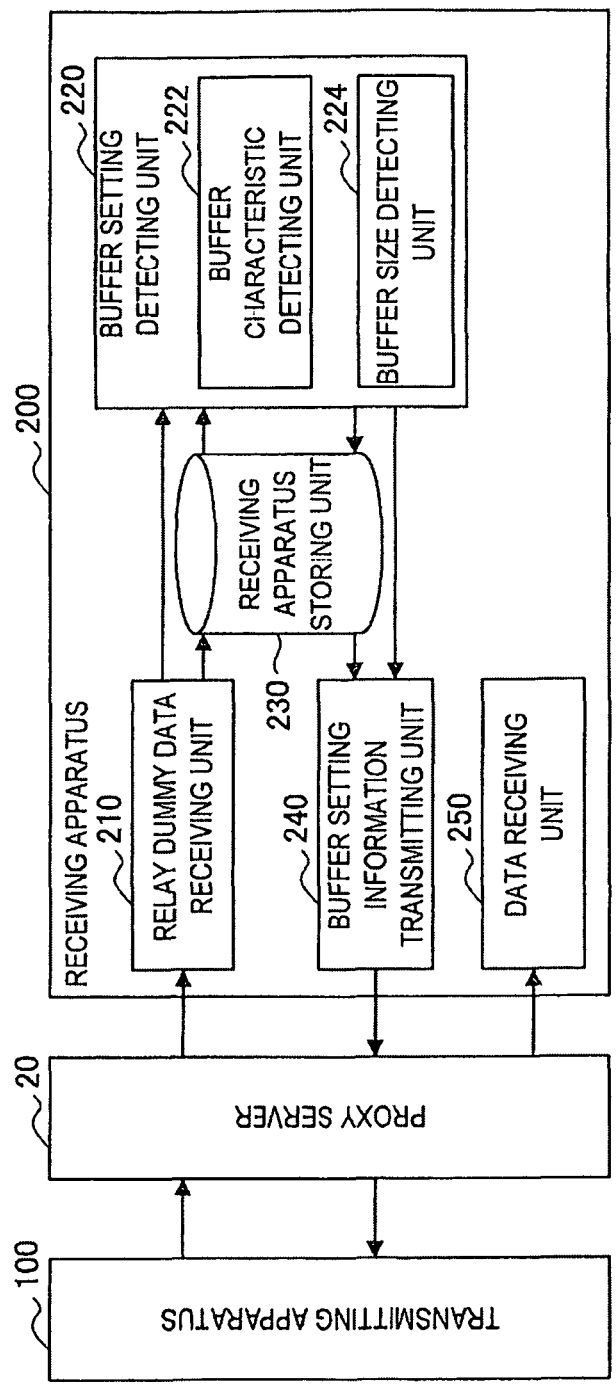
FIG. 6 is a functional block diagram of a receiving apparatus according to the first embodiment of the invention.

The receiving apparatus 200 for detecting the buffer setting of the proxy server will now be described. FIG. 6 is a functional block diagram of the receiving apparatus of the embodiment. The receiving apparatus 200 has a relay dummy data receiving unit 210, a buffer setting detecting unit 220, a receiving apparatus storing unit 230, and a buffer setting information transmitting unit 240.

(Relay Dummy Data Receiving Unit 210)

The relay dummy data receiving unit 210 is a functioning unit of receiving relay dummy data from the proxy server 20. The relay dummy data is dummy data of n bytes and N bytes transmitted from the transmitting apparatus 100 for detecting the buffer setting of the proxy server 20, relayed by the proxy server and, as a result, transmitted to the receiving apparatus 200. The relay dummy data received by the relay dummy data receiving unit 210 is used for detecting the buffer setting of the buffer setting detecting unit 220.

(Buffer Setting Detecting Unit 220)

The buffer setting detecting unit 220 detects the buffer setting of the proxy server 20 based on the relay dummy data received by the relay dummy data receiving unit 210. The relay dummy data may be dummy data received by the relay dummy data receiving unit 210 and stored in the receiving apparatus storing unit 230. The buffer setting detecting unit 220 has a buffer characteristic detecting unit 222 and a buffer size detecting unit 224. The buffer characteristic detecting unit 222 detects the buffer characteristic of the proxy server 20. The buffer size detecting unit 224 detects the buffer size of the proxy server 20. The information of the buffer setting detected by the buffer setting detecting unit 220 is transmitted from the buffer setting information transmitting unit 240 to the transmitting apparatus. The information of the buffer setting detected by the buffer setting detecting unit 220 is stored in the receiving apparatus storing unit 230, and the stored information of the buffer setting may be transmitted from the buffer setting information transmitting unit 240.

(Details of Process of Buffer Setting Detecting Unit: Detection of First Size Value and Second Size Value)

The buffer setting detecting unit 220 will be described in more details below. First, the buffer setting detecting unit 220 detects a first size value as a data size of relay dummy data received first by the relay dummy data receiving unit 210 (hereinbelow, called first relay dummy data). The buffer setting detecting unit 220 compares the data size of relay dummy data received second time by the relay dummy data receiving unit 210 (hereinbelow, called second relay dummy data) with that of relay dummy data received third time (hereinbelow, called third relay dummy data). When the data size of the second relay dummy data and that of the third relay dummy data are different from each other as a result of comparison, the smaller data size is detected as a second size value. When the data size of the second relay dummy data and that of the third relay dummy data are equal to each other as a result of the comparison, the data size is detected as a second size value.

(Details of Process of Buffer Setting Detecting Unit: Detection of Buffer Characteristic)

After that, the buffer characteristic detecting unit compares the first size value and the second size value to detect the buffer characteristic. More specifically, in the case where each of the first and second size values is one byte, the buffer characteristic of buffering no data is detected. In the case where the first size value is not one byte and the second size value is one byte, the buffer characteristic of buffering a predetermined amount of data only once is detected. Further, in the case any of the first and second size values is not one byte, the buffer characteristic of buffering a predetermined amount of data each time is detected.

(Details of Process of Buffer Setting Detecting Unit: Detection of Buffer Size)

On the other hand, the buffer size detecting unit compares the first size value and the second size value to detect the buffer size. More specifically, in the case where each of the first and second size values is one byte, the buffer size is not detected or the buffer size is detected as 0. In the case where the first size value is not one byte and the second size value is one byte, the first size value is detected as a buffer size. Further, in the case any of the first and second size values is not one byte, the first size value or the second size value is detected as a buffer size. In this case, the first and second size values are equal to each other.

(Explanation 1 of Sequence: In the Case Where Data is Not Buffered)

Figure 11:
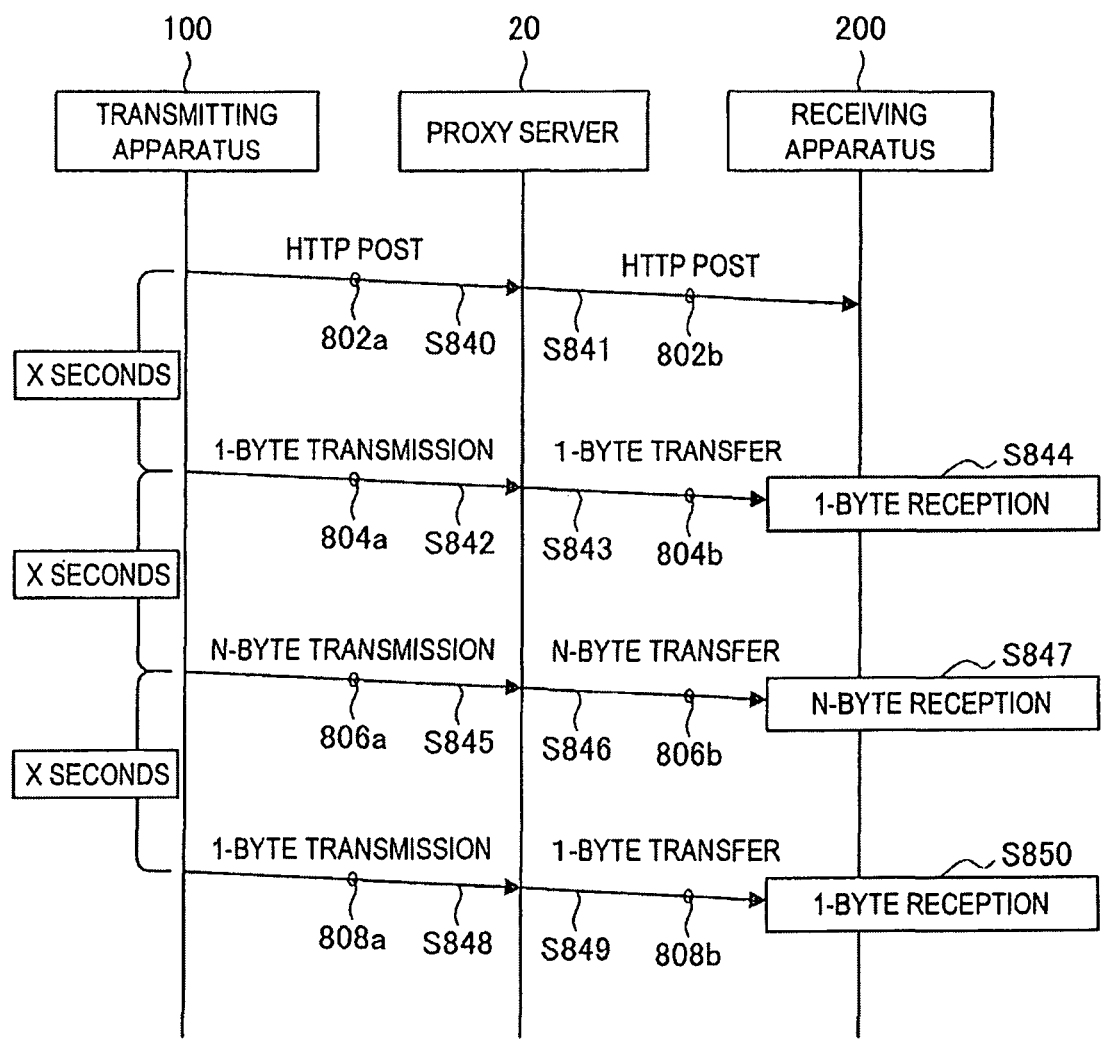
FIG. 11 is a sequence diagram in the case of transmitting dummy data via a proxy server having a buffer characteristic that data is not buffered.

In the following, with reference to FIGS. 11 to 13, the process in the buffer setting detecting unit 220 will be described in more detail. FIG. 11 is a sequence diagram showing the case where dummy data is transmitted via the proxy server having the buffer characteristic of buffering no data. In FIG. 11, dummy data of n bytes and N bytes is transmitted using the HTTP POST request. First, a request header 802a of HTTP POST transmitted from the transmitting apparatus 100 (S840) is relayed by the proxy server 20 (S841), and a request header 802b of the HTTP POST is received by the receiving apparatus 200. Next, dummy data 804a of one byte, dummy data 806a of N bytes, and dummy data 808a of one byte is transmitted from the transmitting apparatus 100 every predetermined time interval of X seconds (S842, S845, and S848). In this case, since the proxy server has the buffer characteristic of buffering no data, the dummy data 804a is promptly relayed by the proxy server 20 (S843), and relayed dummy data 804b is received by the receiving apparatus 200 (S844). Similarly, the dummy data 806a and 808a is promptly relayed by the proxy server 20 (S846 and, S849), and relayed dummy data 806b and 808b is received by the receiving apparatus 200 (S847 and S850).

Therefore, the first size value detected by the buffer setting detecting unit 220 is data size of the relayed dummy data 804b and is one byte. On the other hand, since the data size (N bytes) of the relayed dummy data 806b is larger than the data size (1 byte) of the relayed dummy data 808b, the second size value detected by the buffer setting detecting unit 220 is the data size of the relayed dummy data 808b and is one byte. As described above, when both of the first and second size values are one byte, the proxy server 20 has the buffer characteristic of buffering no data.

(Explanation 2 of Sequence: Buffer Characteristic of Buffering Data Only Once)

Figure 12:
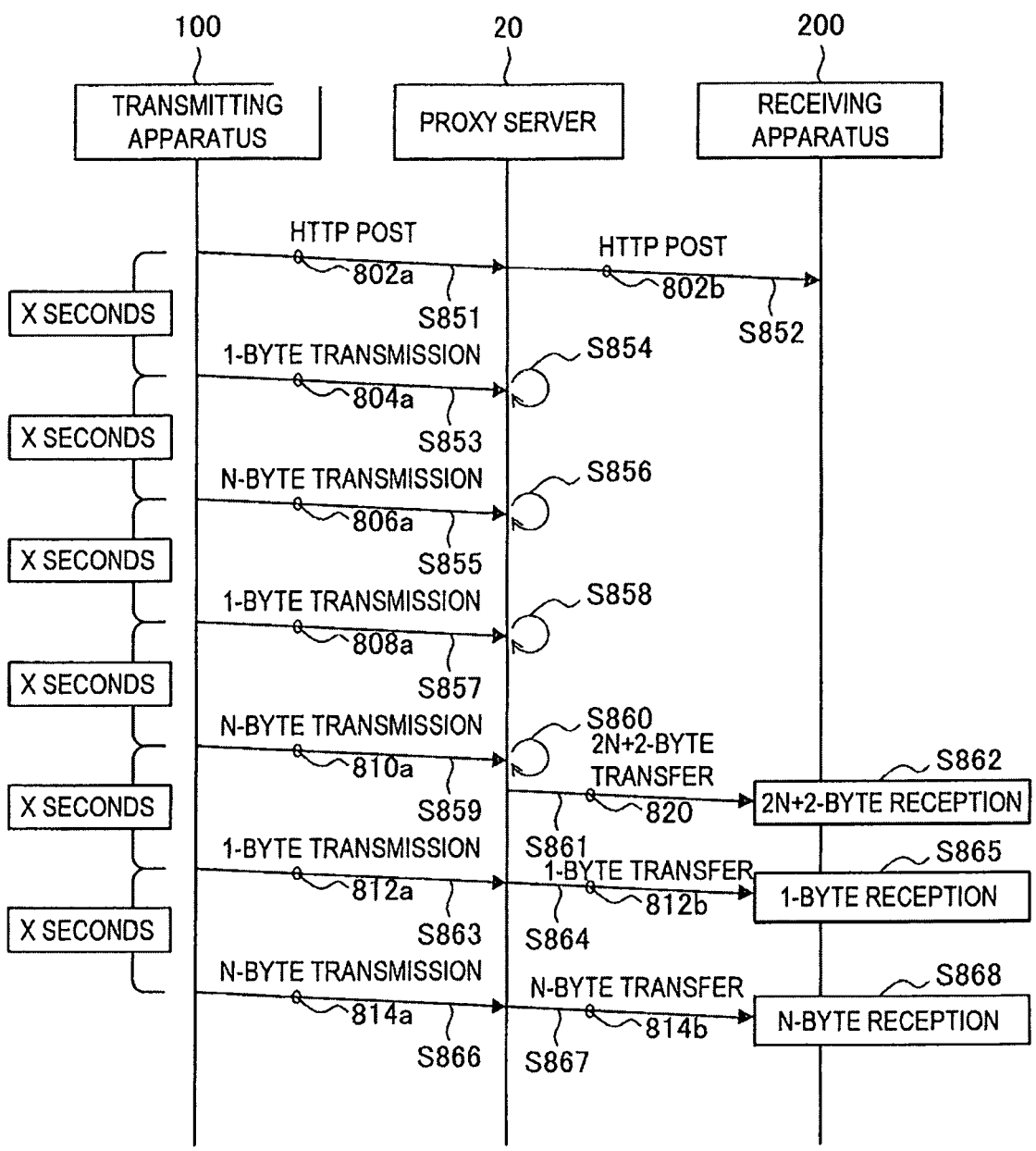
FIG. 12 is a sequence diagram in the case of transmitting dummy data via a proxy server having a buffer characteristic of buffering a predetermined amount of data only once.

FIG. 12 is a sequence diagram showing the case where dummy data is transmitted via the proxy server having the buffer characteristic of buffering a predetermined amount of data only once. The proxy server 20 shown in FIG. 12 has a buffer size of N+5 bytes. In FIG. 12, dummy data of n bytes and N bytes is transmitted using the HTTP POST request. First, in a manner similar to the case of FIG. 11, a request header 802a of HTTP POST transmitted from the transmitting apparatus 100 (S851) is relayed by the proxy server 20 (S852), and a request header 802b of the HTTP POST is received by the receiving apparatus 200. Next, dummy data 804a of one byte, dummy data 806a of N bytes, dummy data 808a of one byte, dummy data 810a of N bytes, dummy data 812a of one byte, and dummy data 814a of N bytes is transmitted from the transmitting apparatus 100 every predetermined time interval of X seconds (S853, S855, S857, S859, S863, and S865).

Since the proxy server 20 shown in FIG. 12 has the buffer characteristic of buffering a predetermined amount of data only once and the buffer size is N+5 bytes, the dummy data of n bytes and N bytes transmitted from the transmitting apparatus 100 is buffered on the proxy server 20 until the total of the data sizes becomes N+5 bytes or more. Therefore, the data from the dummy data 804a to dummy data 808a is received by the proxy server 20 and buffered on the proxy server 20 (S854, S856, and S858). The size of data buffered on the proxy server 20 is N+2 bytes. When the proxy server 20 receives the dummy data 810a, the dummy data 810a is buffered on the proxy server 20 (S860). The total of the data size of the dummy data buffered on the proxy server 20 becomes 2N+2 bytes. In the embodiment, N lies in the range of 1 kilobyte to 10 kilobytes, so that the total of the data size of dummy data buffered on the proxy server 20 becomes the buffer size (2N+2>N+5) of the proxy server 20 or more. Therefore, the relayed dummy data 820 having the data size of 2N+2 bytes is transmitted from the proxy server 20 (S861) and received by the receiving apparatus 200 (S862).

Subsequently, the proxy server 20 transmits the buffered data to the receiving apparatus 200 and, after that, receives the dummy data 812a transmitted (8863) from the transmitting apparatus 100. Since the proxy server 20 has the buffer characteristic of buffering a predetermined amount of data only once, the dummy data 812a is promptly relayed by the proxy server 20 (S864), and relayed dummy data 812b is received by the receiving apparatus 200 (S865). Similarly, dummy data 814a transmitted from the transmitting apparatus 100 (S866) is also promptly relayed by the proxy server 20 (S867), and relayed dummy data 814b is received by the receiving apparatus 200 (S868).

Therefore, the first size value detected by the buffer setting detecting unit 220 is data size of the relayed dummy data 820 and is 2N+2 bytes. On the other hand, since the data size (1 byte) of the relayed dummy data 812b is smaller than the data size (N bytes) of the relayed dummy data 814b, the second size value detected by the buffer setting detecting unit 220 is the data size of the relayed dummy data 812b and is one byte. As described above, when the first size value is not one byte and the second size value is one byte, the proxy server 20 has the buffer characteristic of buffering a predetermined amount of data only once.

Detection of the buffer characteristic of buffering a predetermined amount of data only by once will be further generalized and described. The buffer size of the proxy server 20 is set to (a*N)+b where a≧0 and b≧0. The number of transmission times of dummy data from the transmitting apparatus 100 is set to z, and z≧0. In the following, the case where data exceeds the buffer size of the proxy server 20 at the time point when dummy data of N bytes transmitted at the z-th time from the transmitting apparatus 100 is received by the proxy server 20 and the case where data exceeds the buffer size of the proxy server 20 at the time point when dummy data of one byte transmitted at the z-th time from the transmitting apparatus 100 is received by the proxy server 20 will be described.

First, the case where data exceeds the buffer size of the proxy server 20 at the time point when dummy data of N bytes transmitted at the z-th time from the transmitting apparatus 100 is received by the proxy server 20 will be described. At the time point when dummy data of N bytes transmitted at the z-th time is received by the proxy server 20, dummy data of one byte is received z times and dummy data of N bytes is received z times by the proxy server 20. Therefore, the size of data buffered on the proxy server 20 is expressed by the following equation (1).

[Formula 1]

$$1*z+N*z=z+(z*N) \quad (1)$$

Consequently, the size of relayed dummy data received for the first time by the receiving apparatus 200 is also the data size expressed by the equation (1). Subsequently, dummy data of one byte is transmitted from the transmitting apparatus 100. Since the proxy server 20 has the buffer characteristic of buffering a predetermined amount of data only once, the dummy data is promptly relayed by the proxy server 20, and the relayed dummy data of one byte is received by the receiving apparatus 200. Subsequently, dummy data of N bytes is transmitted from the transmitting apparatus 100. In a manner similar to the above, the dummy data is promptly relayed by the proxy server 20, and the relayed dummy data of N bytes is received by the receiving apparatus 200. Therefore, the receiving apparatus 200 receives the relayed dummy data of z+(z*N) bytes, that of one bytes, and that of N bytes in order. As a result, the first size value detected by the buffer setting detecting unit 220 is z+(z*N) bytes, and the second size value is one byte. That is, the first size value is not one byte, and the second size value is one byte.

Next, the case where data exceeds the buffer size of the proxy server 20 at the time point when dummy data of one byte transmitted at the z-th time from the transmitting apparatus 100 is received by the proxy server 20 will be described. At the time point when dummy data of one byte transmitted at the z-th time is received by the proxy server 20, dummy data of one byte is received z times and dummy data of N bytes is received (z−1) times by the proxy server 20. Therefore, the size of data buffered on the proxy server 20 is expressed by the following equation (2).

[Formula 2]

$$1*z+N*(z-1)=z+(z-1)*N \quad (2)$$

Consequently, the size of relayed dummy data received for the first time by the receiving apparatus 200 is also the data size expressed by the equation (2). Subsequently, dummy data of N bytes is transmitted from the transmitting apparatus 100. Since the proxy server 20 has the buffer characteristic of buffering a predetermined amount of data only once, the dummy data is promptly relayed by the proxy server 20, and the relayed dummy data of N bytes is received by the receiving apparatus 200. Subsequently, dummy data of one byte is transmitted from the transmitting apparatus 100. In a manner similar to the above, the dummy data is promptly relayed by the proxy server 20, and the relayed dummy data of one byte is received by the receiving apparatus 200. Therefore, the receiving apparatus 200 receives the relayed dummy data of z+(z−1)*N bytes, that of N bytes, and that of one byte in order. As a result, the first size value detected by the buffer setting detecting unit 220 is z+(z−1)*N bytes, and the second size value is one byte. That is, the first size value is not one byte, and the second size value is one byte.

It is understood from the above that, when the first size value is not 1 and the second size value is 1, the buffer characteristic of buffering a predetermined amount of data only once irrespective of the buffer size of the proxy server 20 and the number of transmission times of dummy data. It is also understood that the first size value may become larger than the buffer size of the actual proxy server 20. Therefore, by detecting the first size value as a buffer size, based on the detected first size value, adding compensation dummy data in the transmitting apparatus 100, and transmitting the resultant data, the data can be reliably promptly relayed to the proxy server 20. In this case, the first size value depends on the value of N and does not accurately match the actual buffer size (a*N)+b of the proxy server 20. However, as described above, the value of N can be adjusted according to the precision of the necessary buffer size. In the buffer characteristic of buffering a predetermined amount of data only once, data to which compensation dummy data based on the detected buffer size is added is transmitted only once. Therefore, the possibility that transmission of the data to which the compensation dummy data based on the detected buffer size becomes a cause of a load on the network is extremely low.

(Explanation 3 of Sequence: Buffer Characteristic of Buffering Data Each Time)

Figure 13:
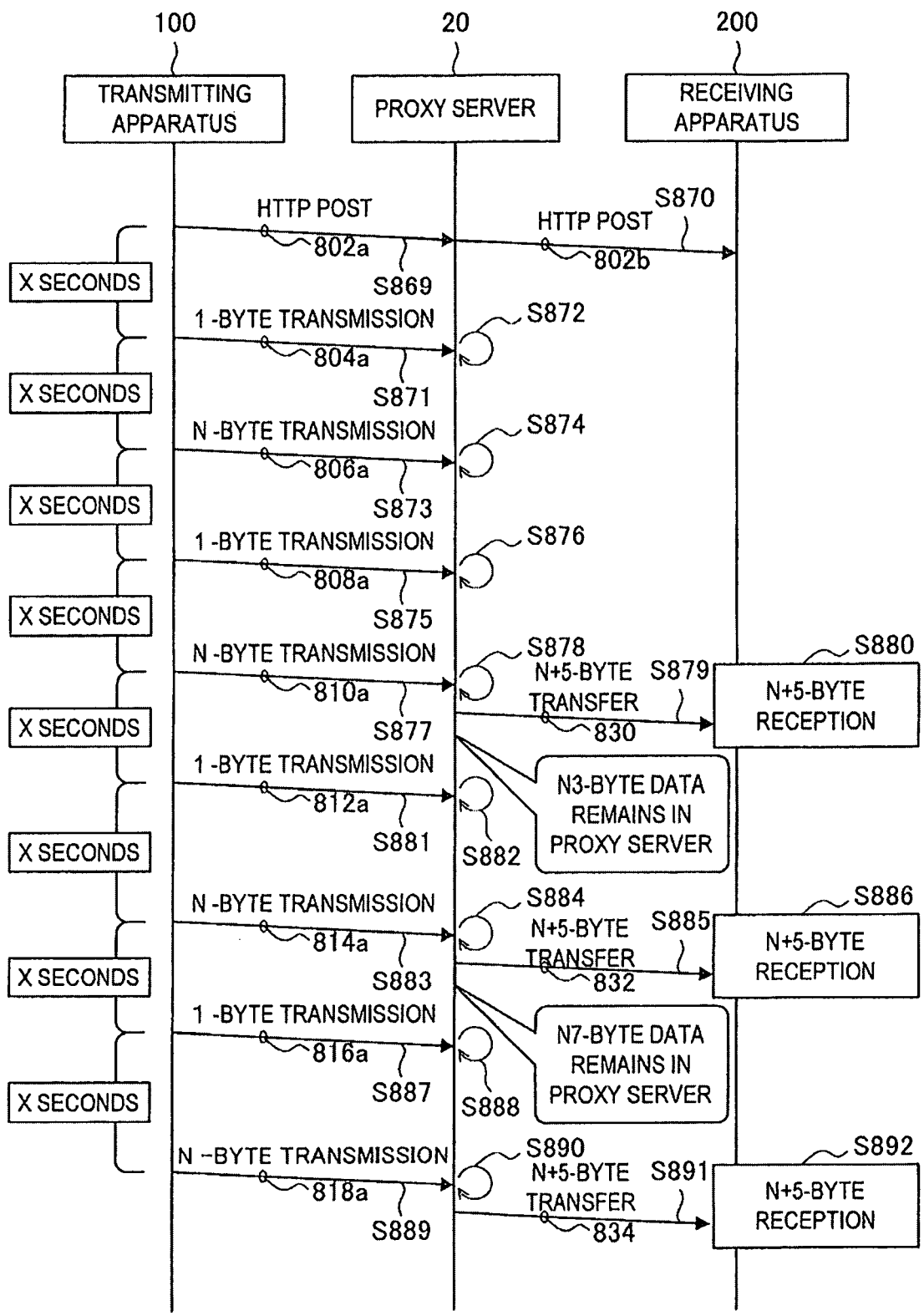
FIG. 13 is a sequence diagram in the case of transmitting dummy data via a proxy server having a buffer characteristic of buffering a predetermined amount of data each time.

FIG. 13 is a sequence diagram showing the case where dummy data is transmitted via the proxy server having the buffer characteristic of buffering a predetermined amount of data each time. The proxy server 20 shown in FIG. 13 has a buffer size of N+5 bytes. In FIG. 13, dummy data of n bytes and N bytes is transmitted using the HTTP POST request.

First, in a manner similar to the cases of PIGS. 11 and 12, a request header 802a of HTTP POST transmitted from the transmitting apparatus 100 (S869) is relayed by the proxy server 20 (S870), and a request header 802b of the HTTP POST is received by the receiving apparatus 200. Next, dummy data 804a of one byte, dummy data 806a of N bytes, dummy data 808a of one byte, dummy data 810a of N bytes, dummy data 812a of one byte, dummy data 814a of N bytes, dummy data 816a of one byte, and dummy data 818a of N bytes is transmitted from the transmitting apparatus 100 every predetermined time interval of X seconds (S871, S873, S875, S877, S881, S881, S883, S887, and S889).

Since the proxy server 20 shown in FIG. 13 has the buffer characteristic of buffering a predetermined amount of data each time and the buffer size is N+5 bytes, the dummy data of n bytes and N bytes transmitted from the transmitting apparatus 100 is buffered on the proxy server 20 until the total of the data sizes becomes N+5 bytes or more. Therefore, the data from the dummy data 804a to dummy data 808a is received by the proxy server 20 and buffered on the proxy server 20 (S872, S874, and S876). The size of data buffered on the proxy server 20 is N+2 bytes.

When the proxy server 20 receives the dummy data 810a, the dummy data 810a is buffered on the proxy server 20 (S878). The total of the data size of the dummy data buffered on the proxy server 20 becomes 2N+2 bytes. In the embodiment, N lies in the range of 1 kilobyte to 10 kilobytes, so that the total of the data size of dummy data buffered on the proxy server 20 becomes the buffer size (2N+2>N+5) of the proxy server 20 or more. Therefore, the relayed dummy data 830 is transmitted from the proxy server 20 (S879) and received by the receiving apparatus 200 (S880). The size of the relayed dummy data transmitted at this time is N+5 bytes, and data of the size expressed by the following equation (3) is buffered on the proxy server 20.

[Formula 3]

$$(2N+2)-(N+5)=N-3 \quad (3)$$

Subsequently, the proxy server 20 transmits the buffered data to the receiving apparatus 200 and, after that, receives the dummy data 812a transmitted (S881) from the transmitting apparatus 100 and buffers it (S882). The size of the data buffered on the proxy server 20 at the time point is N−2 bytes. Subsequently, the proxy server 20 receives dummy data 814a transmitted (S883) from the transmitting apparatus 100 and buffers it (S884). The size of the data buffered on the proxy server 20 at the time point is 2N−2 bytes. In the embodiment, N lies in the range from 1 kilobyte to 10 kilobytes, so that the total of the data size of dummy data buffered on the proxy server 20 becomes the buffer size (2N−2>N+5) of the proxy server 20 or more. Therefore, the relayed dummy data 832 is transmitted from the proxy server 20 (S885) and received by the receiving apparatus 200 (S886). The data size of the relayed dummy data transmitted at this time is N+5 bytes, and data having the size expressed by the following equation (4) is buffered on the proxy server 20.

[Formula 4]

$$(2N-2)-(N+5)=N-7 \quad (4)$$

Further, the proxy server 20 receives dummy data 816a transmitted (S887) from the transmitting apparatus 100 and buffers it (S888). At this time point, the size of data buffered on the proxy server 20 becomes N−6 bytes. Subsequently, the proxy server 20 receives the dummy data 818a transmitted from the transmitting apparatus 100 (S889) and buffers it (S890). At this time point, the size of data buffered on the proxy server 20 becomes 2N−6 bytes. Therefore, in a manner similar to the above, the total of the size of the dummy data buffered on the proxy server 20 becomes equal to or larger than the buffer size (2N−6>N+5 bytes) of the proxy server 20. Relayed dummy data 834 is transmitted from the proxy server 20 (S891) and received by the receiving apparatus 200 (S892). The size of the relayed dummy data transmitted at this time is N+5 bytes. On the proxy server 20, data having the size expressed by the following equation (5) is buffered.

[Formula 5]

$$(2N-6)-(N+5)=N-11 \quad (5)$$

Therefore, the first size value detected by the buffer setting detecting unit 220 is data size of the relayed dummy data 830 and is N+5 bytes. On the other hand, since the data size of the relayed dummy data 832 and that of the relayed dummy data 834 are equal to each other and are N+5 bytes, the second size value detected by the buffer setting detecting unit 220 is also N+5 bytes. As described above, when the first size value is not one byte and the second size value is not one byte, the proxy server 20 has the buffer characteristic of buffering a predetermined amount of data each time.

The buffer size of the proxy server 20 will be generalized as (a*N)+b where a≧0 and b≧0 and description will be given. When the size of data buffered on the proxy server 20 exceeds the buffer size, the proxy server 20 having the buffer characteristic of buffering a predetermined amount of data each time transmits, as relayed dummy data, data having a data size equal to the buffer size. Therefore, the receiving apparatus 200 receives relayed dummy data having the data size of (a*N)+b each time. As a result, the first and second size values detected by the buffer setting detecting unit 220 are equal to each other, and the buffer size becomes the buffer size (a*N)+b bytes of the actual proxy server 20. That is, the first size value is not one byte, and the second size value is not one byte.

It is understood from the above that, when the first size value is not 1 and the second size value is not 1, the buffer characteristic of buffering a predetermined amount of data each time can be detected. It is also understood that the first size value and the second size value become equal to the buffer size of the actual proxy server 20. Therefore, the first size value or the second size value is detected as a buffer size, based on the detected value, data size d of the compensation dummy data in the transmitting apparatus 100 is determined, and the compensation dummy data having the determined data size is added to transmission data. By transmitting the data in such a manner, the data can be reliably promptly relayed to the proxy server 20.

(Receiving Apparatus Storing Unit 230)

Referring again to FIG. 6, the receiving apparatus storing unit 230 stores the relayed dummy data received by the relayed dummy data receiving unit 210. The stored relayed dummy data is used for detecting the buffer setting in the buffer setting detecting unit 220. The receiving apparatus storing unit 230 stores the buffer setting detected by the buffer setting detecting unit 220. The stored buffer setting is transmitted by the buffer setting information transmitting unit 240 to the transmitting apparatus 100.

(Buffer Setting Information Transmitting Unit 240)

The buffer setting information transmitting unit. 240 transmits the information of the buffer setting detected by the buffer setting detecting unit 220 to the transmitting apparatus 100 via the proxy server 20. The information of the buffer setting transmitted from the buffer setting information transmitting unit 240 may be information of buffer setting detected by the buffer setting detecting unit 220 and stored in the receiving apparatus storing unit 230. In the case where dummy data of n bytes and N bytes is transmitted from the transmitting apparatus 100 using the HTTP POST connection, information of the buffer setting detected may be written in a response header to an HTTP POST request and transmitted to the transmitting apparatus 100. It is also possible to establish another connection and transmit the information to the transmitting apparatus 100.

(Data Receiving Unit 250)

The data receiving unit 250 receives data transmitted from the transmitting apparatus 100. For example, transmission data to which compensation dummy data is added, transmitted from the data transmitting unit 130 of the transmitting apparatus is received by the data receiving unit 250 via the proxy server 20.

(Flow of Processes: Proxy Server Existence Determining Process)

Figure 7:
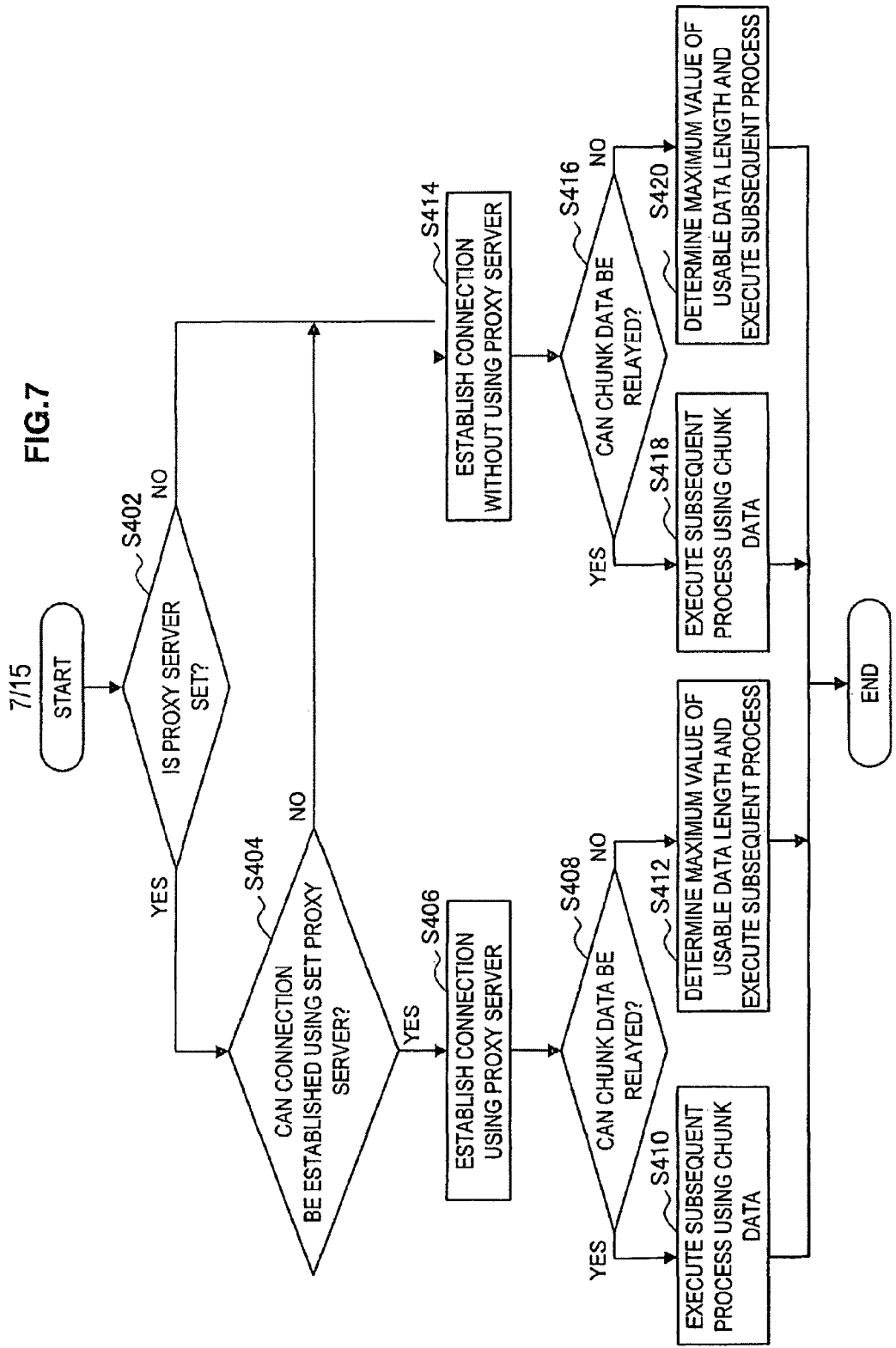
FIG. 7 is a flowchart showing an example of a proxy server existence determining process according to the first embodiment of the invention.
Figure 8:
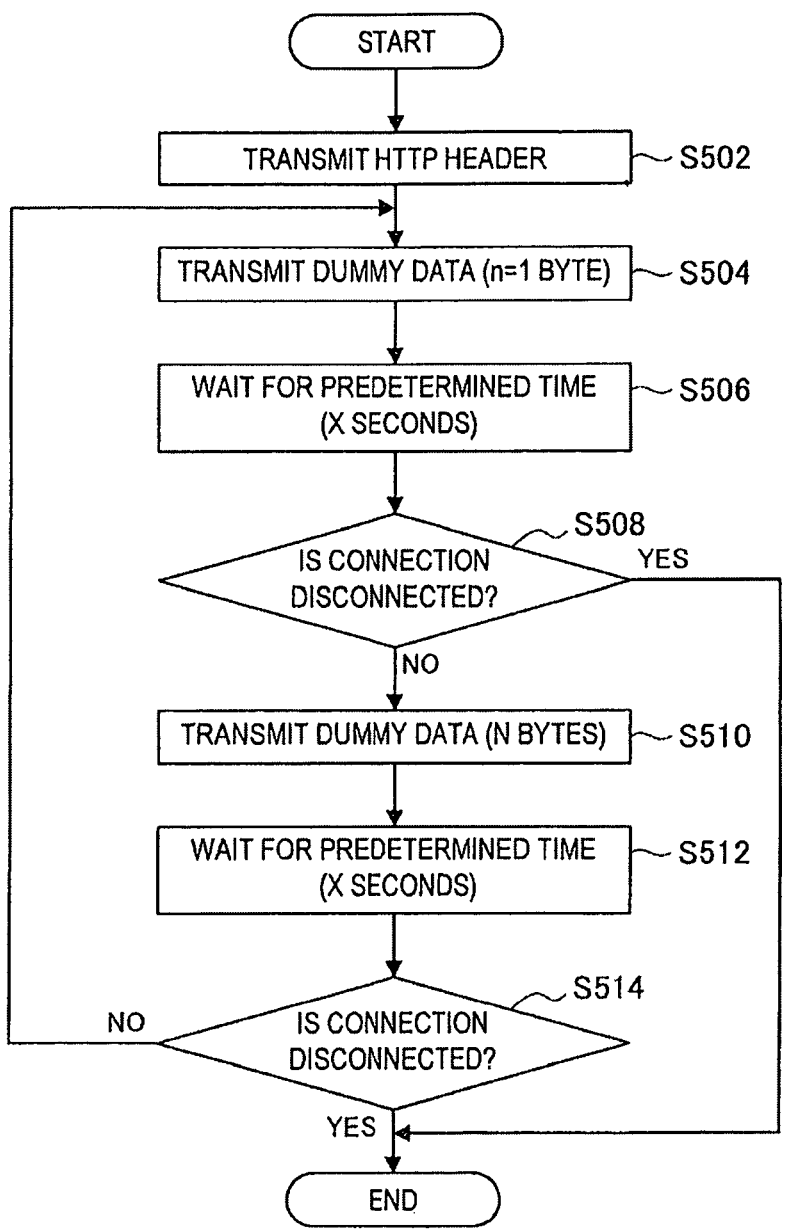
FIG. 8 is a flowchart showing process of transmitting n-byte and N-byte dummy data according to the first embodiment of the invention.
Figure 9:
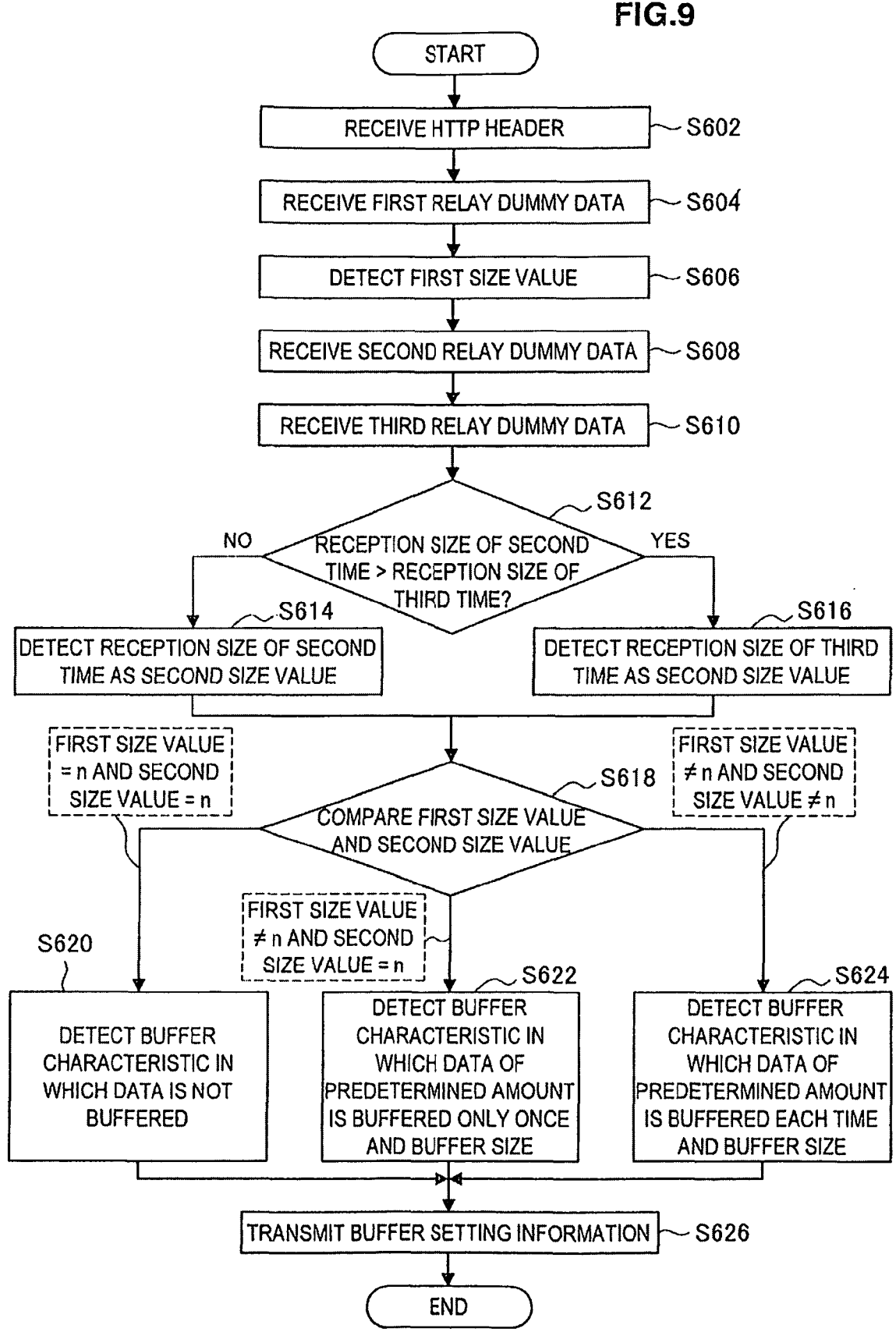
FIG. 9 is a flowchart showing buffer setting detecting process according to the first embodiment of the invention.

With reference to FIGS. 7 to 9, the flow of processes in the transmitting apparatus 100 and the receiving apparatus 200 in the embodiment will be described. First, proxy server existence determining process performed by the proxy server existence determining unit 102 of the transmitting apparatus 100 will be described. FIG. 7 shows the flowchart as an example of the proxy server existence determining process in the embodiment.

First, in step S402, whether the proxy server 20 to be used is set or not is determined. In the case where the proxy server 20 is set, setting information of the proxy server 20 is obtained. For example, by obtaining proxy setting set in the browser of the OS of the transmitting apparatus 100 from the registry, the setting information of the proxy server 20 may be obtained. In the case where a proxy server is set in step S402, step S404 follows. In the case where a proxy server is not set in step S402, step S414 follows.

In step S404, an attempt is made to see whether or not a connection to the receiving apparatus 200 can be established using the proxy server 20 shown in the proxy server setting obtained in step S402. In the case where the attempt to establish a connection using the proxy server 20 succeeds in step S404, step S406 follows and the connection using the proxy server 20 is established. In the case where the attempt to establish a connecting using a proxy server fails in step S404, step S414 follows.

Further, when the connection is established using the proxy server 20 in step S406, step S408 follows. In step S408, whether the proxy server 20 used can relay chunk data or not is determined. Whether the proxy server 20 can relay chunk data or not is determined by transmitting an HTTP header to the receiving apparatus 200. In the case where an HTTP error code "501 Not Implemented" or "411 Length Required" is received as a result of the transmission of the HTTP header, the proxy server 20 can hardly relay chunk data, and the process continues to step S412. In the other cases, the proxy server 20 can relay chunk data, and the process continues step S410. After that, in step S410, subsequent process is performed by the dummy data transmitting unit 110 using chunk data.

On the other hand, in the case where the proxy server can hardly relay chunk data, the maximum value of usable data length (hereinbelow, called maximum data length) is determined in step S412. The maximum data length is determined by a method of transmitting data having a large data length and, in the case where an HTTP error code "413 Request Entity Too Large" is received, decreasing the data length. After determination of the maximum data length by the above-described method, subsequent process is performed by the dummy data transmitting unit 110 based on the determined maximum data length.

In the case where the proxy server 20 is not set in step S402 or in the case where an attempt to establish a connecting using the proxy server 20 fails in step S404, in step S414, a connection to the receiving apparatus 200 is established without using the proxy server 20. After the connection to the receiving apparatus 200 is established in step S414, step S416 follows.

In step S416, determining process similar to that of step S408 is performed. The reason why the determining process is performed in step S416 is because, even in the case where the proxy server 20 is not set or establishment of a connection using the proxy server 20 fails, there is the possibility that a transparent proxy server exists. In the case where it is determined in step S416 that a transparent proxy server can hardly relay chunk data, the process continues to step S420. In the other cases, a transparent proxy server can relay chunk data, and the process continues to step S418. After that, in step S418, subsequent process is performed by the dummy data transmitting unit 110 using chunk data in step s418.

On the other hand, in the case where a transparent proxy server can hardly relay chunk data, like the step S412, the maximum data length is determined in step S420 and, based on the determined maximum data length, subsequent process is performed in the dummy data transmitting unit 110.

The process described with reference to FIG. 7 is an example of the proxy server existence determining process of the embodiment. The proxy server existence determining unit 102 is not limited to the above-described process but performs information collection, a process and the like as necessary.

(Flow of Processes: Dummy Data Transmitting Process)

Next, the process of transmitting dummy data of n bytes and N bytes to be performed in the dummy data transmitting unit 110 of the transmitting apparatus 100 will be described. FIG. 8 shows a flowchart of process of transmitting dummy data of n bytes and N bytes in the embodiment.

First, in step S502, using the connection established by the proxy existence determining unit 102, an HTTP header is transmitted to the receiving apparatus 200. In step S504, dummy data of one byte is transmitted to the receiving apparatus 200 via the proxy server 20. Further, in step S506, the data transmitting unit 110 waits for X seconds as the transmission interval. After that, in step S508, whether the connection is disconnected or not is determined. In the case where the connection is disconnected, the process is finished. In the case where the connection is continued, step S510 follows. In step S510, dummy data of N bytes is transmitted to the receiving apparatus 200 via the proxy server 20. Further, in step S512, the dummy data processing unit 110 waits for predetermined time interval of X seconds. After that, in step S514, whether the connection is disconnected or not is determined. In the case where the connection is disconnected, the process is finished. In the case where the connection continues, the unit returns to step S504 and dummy data of one byte is transmitted. As described above, dummy data transmitted from the dummy data transmitting unit 110 of the transmitting apparatus 100 is relayed by the proxy server 20 and the relayed dummy data is received by the receiving apparatus 200.

(Flow of Processes: Buffer Setting Detecting Process)

Subsequently, the process of receiving dummy data relayed by the proxy server 20 by the receiving apparatus 200 and detecting a buffer setting will be described. FIG. 9 shows a flowchart of buffer setting detecting process in the embodiment.

First, in step S602, the HTTP header transmitted from the transmitting apparatus 100 in step S502 in FIG. 8 is received by the relayed dummy data receiving unit 210 in the receiving apparatus 200. Next, in step S604, the relayed dummy data transmitted from the transmitting apparatus 100 and relayed by the proxy server 20 is received for the first time by the relayed dummy data receiving unit 210. Further, in step S606, the buffer setting detecting unit 220 detects a first size value as the size of the relayed dummy data received in step S604. After that, in step S608, the relayed dummy data is received for the second time by the relayed dummy data receiving unit 210. Subsequently, in step S610, the relayed dummy data is received for the third time by the relayed dummy data receiving unit 210.

Further, in step S612, the buffer setting detecting unit 220 compares the data sizes of the relayed dummy data received in steps S608 and S610 with each other to detect the second size value. In the case where the size of the relayed dummy data received in the step S608 is equal to that of the relayed dummy data received in step S610 or smaller than that of the relayed dummy data received in step S610, in step S614, the buffer setting detecting unit 220 detects the data size of the relayed dummy data received in step S608 as the second size value. On the contrary, in the case where the size of the relayed dummy data received in step S608 is larger than that of the relayed dummy data received in step S610, in step S616, the buffer setting detecting unit 220 detects the size of the relayed dummy data received in step S610 as a second size value.

After that, in step S618, the buffer setting detecting unit 220 compares the first size value detected in step S606 and the second size value detected in step S614 or S616. In the embodiment, n is one byte (n=1). In the case where the first size value is one byte and the second size value is one byte, step S620 follows, and the buffering characteristic of buffering no data is detected by the buffer characteristic detecting unit 222.

On the other hand, in the case where the first size value is not one byte and the second size value is one byte, step S622 follows, and the buffer characteristic detecting unit 222 detects the buffer characteristic of buffering a predetermined amount of data only once. In step S622, the buffer size detecting unit 224 detects the first size value as a buffer size.

Further, in the case where the first size value is not one byte and the second size value is not one byte, step S624 follows, and the buffer characteristic detecting unit 222 detects the buffer characteristic of buffering a predetermined amount of data each time. In step S624, the buffer size detecting unit 224 detects the buffer size. The first and second size values are equal to each other, and the size value is detected as the buffer size.

After that, in step S626, the buffer setting including the buffer characteristic and the buffer size is transmitted from the buffer setting information transmitting unit 240 to the transmitting apparatus 100 via the proxy server 20.

(Flow of Processes: Compensation Dummy Data Transmitting Process)

Figure 10:
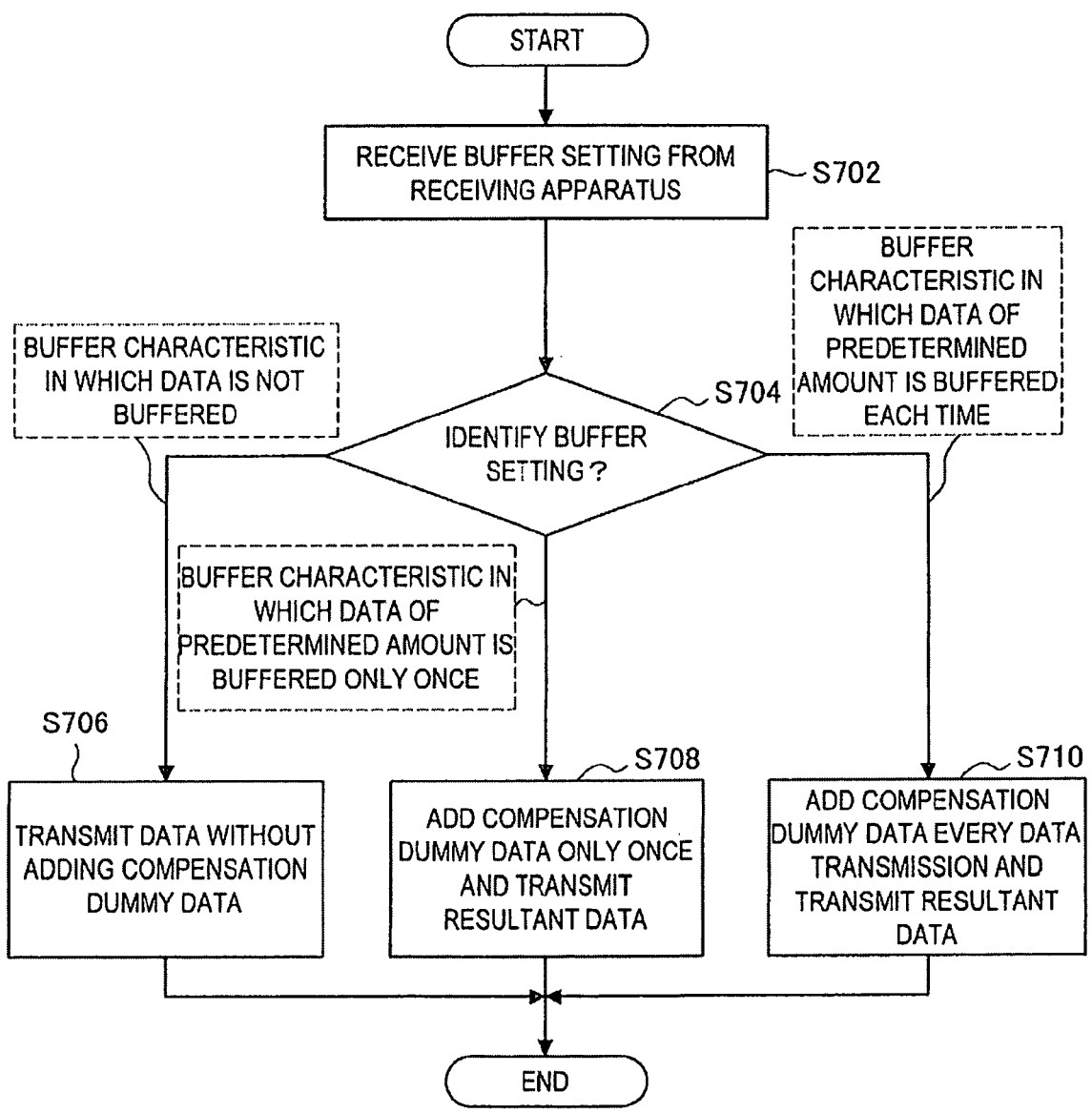
FIG. 10 is a flowchart showing processes of receiving buffer setting information and transmitting compensation dummy data according to the first embodiment of the invention.

The process of receiving the buffer setting transmitted from the receiving apparatus 200 by a receiving apparatus and transmitting compensation dummy data will be described. FIG. 10 is a flowchart showing buffer setting information receiving process and compensation dummy data transmitting process in the embodiment.

First, in step S702, the buffer setting transmitted from the receiving apparatus 200 via the proxy server 20 is received by the buffer setting receiving unit 120 in the transmitting apparatus 100. Subsequently, in step S704, the buffer setting received by the buffer setting identifying unit 122 is identified as any of the buffer characteristic of buffering no data, the buffer characteristic of buffering a predetermined amount of data only once, and the buffer characteristic of buffering a predetermined amount of data each time. In the identification of the buffer setting in step S704, the buffer size is also identified.

When it is identified in step S704 that the buffer setting received in step S702 is the buffer characteristic of buffering no data, the compensation data size determining unit 160 determines the data size d of compensation dummy data as 0 in step S706. Further, the data transmitting unit 130 transmits data requiring immediacy without adding compensation dummy data.

On the other hand, when it is identified in step S704 that the buffer setting received in step S702 is the buffer characteristic of buffering a predetermined amount of data only once, in step S708, the compensation data size determining unit 160 determines the data size d of compensation dummy data based on the buffer size identified in step S704. Further, the data transmitting unit 130 adds compensation dummy data having the data size d determined by the compensation data size determining unit 160 only once and transmits data requiring immediacy.

When it is identified in step S704 that the buffer setting received in step S702 is the buffer characteristic of buffering a predetermined amount of data each time, in step S710, the compensation data size determining unit 160 determines the data size d of compensation dummy data based on the buffer size identified in step S704. Further, the data transmitting unit 130 adds compensation dummy data having the data size d determined by the compensation data size determining unit 160 at each transmission of data requiring immediacy and transmits the resultant data.

(Example of HTTP POST Request)

Figure 14:
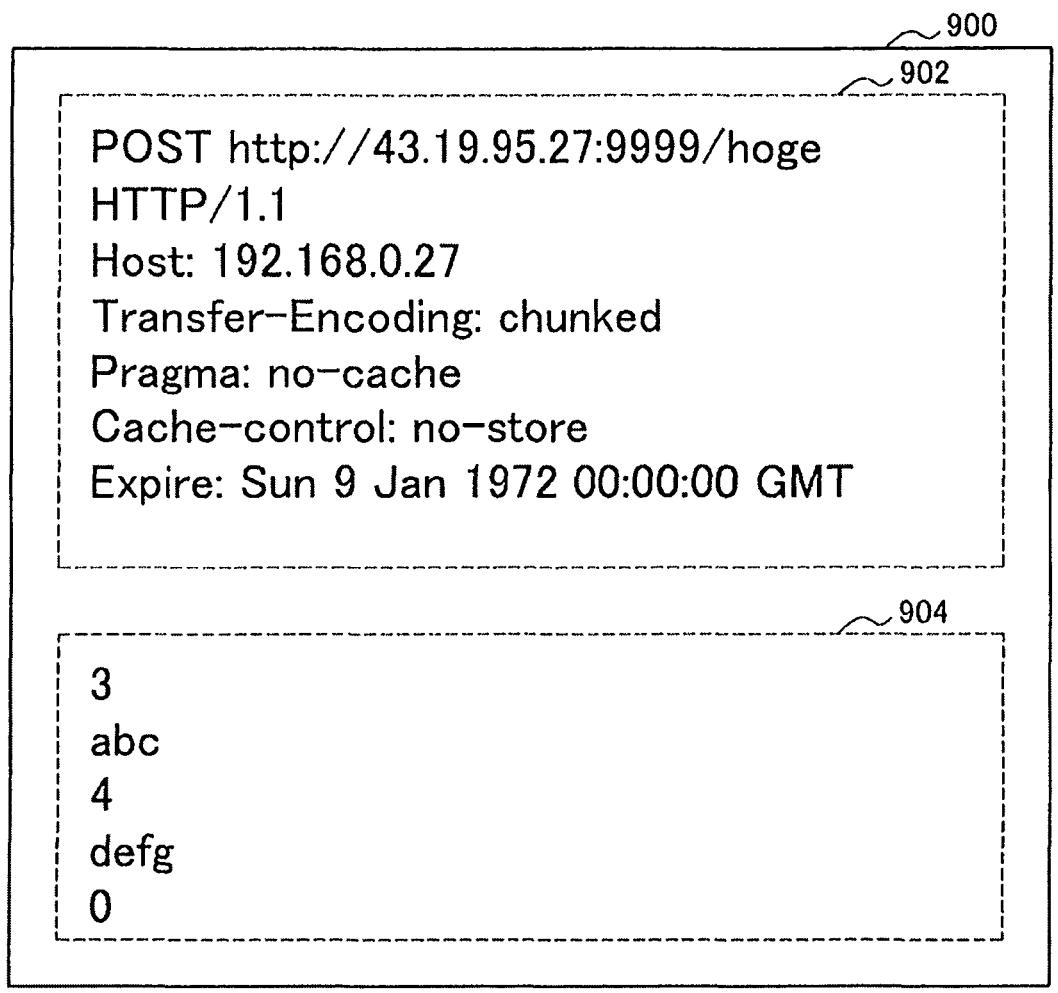
FIG. 14 is an explanatory diagram showing an example of an HTTP POST request.

An example of data transmitted/received between the transmitting apparatus 100 and the receiving apparatus 200 in the embodiment will be described. FIG. 14 shows an example of the HTTP POST request. An HTTP POST request 900 is constructed by a request header 902 and a request body 904. In the embodiment, sequential repetitive transmission of dummy data of n bytes and N bytes from the transmitting apparatus 100 is equivalent to addition of data to the request body 904 in the HTTP POST request 900.

(Example of Transmission of Detection Result)

Figure 15:
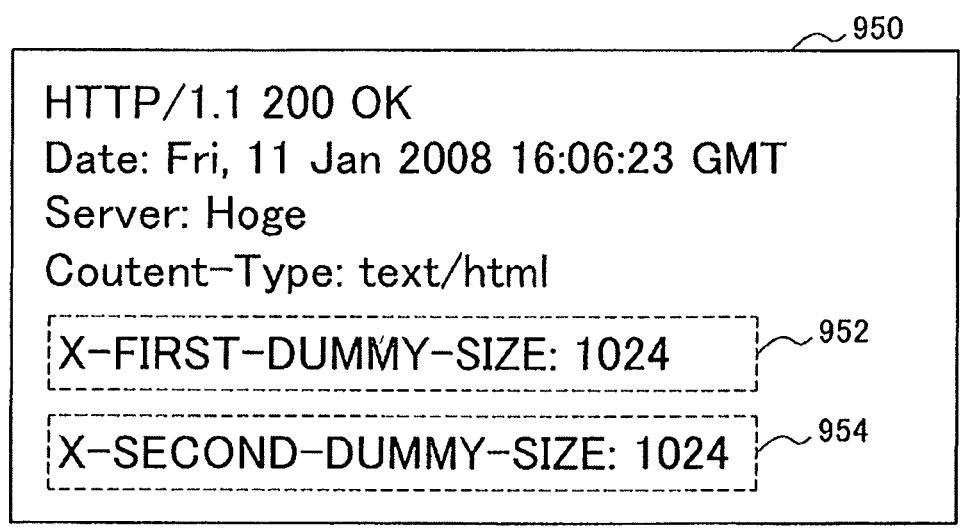
FIG. 15 is an explanatory diagram showing an example of buffer setting information transmitted from a receiving apparatus to a transmitting apparatus.

FIG. 15 shows an example of buffer setting information transmitted from the receiving apparatus 200 to the transmitting apparatus 100. The buffer setting may be written in a response header 950 to the HTTP POST request of transmitting dummy data of n bytes and N bytes from the transmitting apparatus 100 to the receiving apparatus 200, and transmitted to the transmitting apparatus 100. In the example of FIG. 15, the first size value detected by the receiving apparatus 200 is written in X-FIRST-DUMMY-SIZE field 952, and is 1,024 bytes. The second size value is written in X-SECOND-DUMMY-SIZE field 952, and is 1,024 bytes. The response header 950 shown in FIG. 15 is an example of the response header transmitted from the receiving apparatus 200 to the transmitting apparatus 100. The buffer setting written in the response header may be a buffer characteristic and a buffer size.

In the embodiment, the case of transmitting dummy data of n bytes and N bytes using the HTTP POST request from the transmitting apparatus 100 and detecting the buffer setting has been described. For transmission of the dummy data, an HTTP GET response may be used. In the case of transmitting dummy data of n bytes and N bytes using the HTTP POST request, the transmitting apparatus 100 is an HTTP client, and the receiving apparatus 200 is an HTTP server. In the case of transmitting dummy data of n bytes and N bytes using an HTTP GET response, the transmitting apparatus 100 is an HTTP server, and the receiving apparatus 200 is an HTTP client.

In the case of transmitting dummy data of n bytes and N bytes using the HTTP POST, the buffer setting detected by the receiving apparatus 200 is written in the response header for the HTTP POST and the resultant data may be transmitted to the transmitting apparatus 100, or transmitted to the transmitting apparatus 100 using another connection. On the other hand, in the case of transmitting dummy data of n bytes and N bytes using the HTTP GET request, the buffer setting detected by the receiving apparatus 200 is transmitted to the transmitting apparatus 100 via a connection different from the HTTP connection in which the dummy data is transmitted.

In the embodiment, the buffer setting detecting unit 220 in the receiving apparatus 200 compares the first and second size values with each other, and detects the buffer setting. It is also possible to detect the first and second size values in the buffer setting detecting unit 220, and the buffer characteristic and the buffer size may be detected by the buffer setting identifying unit 122 in the transmitting apparatus 100. In this case, the buffer setting transmitted from the receiving apparatus 200 to the transmitting apparatus 100 is the first and second size values.

It should be understood by those skilled in the art that various modifications, combination, sub-combinations and alterations may occur depending on design requirements and other factors insofar as they are within the scope of the appended claims or the equivalents thereof.

What is claimed is:

1. A receiving apparatus comprising:
    a relayed dummy data receiving unit for receiving relayed dummy data including dummy data of n bytes (n≧1) and/or dummy data of N bytes (N≧n) from a relay server, and the relayed dummy data is sequentially and repetitively transmitted from a transmitting apparatus to the relay server;
    a transmission data receiving unit for receiving transmission data transmitted by the relay server; and
    a buffer setting detecting unit for detecting a buffer setting of the relay server based on a first size value indicative of data size of relayed dummy data received for the first time by the relayed dummy data receiving unit and a second size value indicative of not larger data size of relayed dummy data received for the second time and relayed dummy data received for the third time;
    wherein the buffer setting indicates a quantity of instances that the relay server buffers a predetermined amount of the transmission data transmitted to the transmission data receiving unit.

2. The receiving apparatus according to claim 1,
    wherein the buffer setting indicates, if each of the first size value and the second size value is n bytes, that the quantity is zero.

3. The receiving apparatus according to claim 2,
    wherein the buffer setting indicates, if the first size value is not n bytes and the second size value is n bytes, that the quantity is one, and
    the buffer setting indicates, if each of the first and second size values is not n bytes, that the quantity is equal to a quantity of instances that the relay server transmits the transmission data.

4. The receiving apparatus according to claim 1,
    wherein the buffer setting detecting unit detects the first size value as buffer size of the relay server if the first size value is not n bytes and the second size value is n bytes, and the buffer setting detecting unit detects the first or second size value as buffer size of the relay server if each of the first and second size values is not n bytes.

5. The receiving apparatus according to claim 1,
    further comprising a buffer setting information transmitting unit for transmitting buffer setting of the relay server detected by the buffer setting detecting unit to the transmitting apparatus.

6. The receiving apparatus according to claim 1,
    wherein the transmitting apparatus and the receiving apparatus perform communication by HTTP or HTTPS, the relay server is an HTTP proxy server,
    the relayed dummy data is transmitted in response to a GET response or a POST request, and
    information of the buffer setting is transmitted as response information to the POST request, if the relayed dummy data is transmitted in response to the POST request.

7. A transmitting apparatus comprising,
    a dummy data transmitting unit for transmitting dummy data of n bytes (n≧1) and dummy data of N bytes (N≧n) sequentially and repetitively to a relay server, and
    a transmission data transmitting unit for transmitting transmission data to the relay server,
    wherein relayed dummy data including the dummy data of n bytes and/or the dummy data of N bytes is received by a receiving apparatus, the transmission data is received by the receiving apparatus, and a buffer setting of the relay server is detected based on size of the received relayed dummy data by the receiving apparatus; and
    wherein the buffer setting indicates a quantity of instances that the relay server buffers a predetermined amount of the transmission data transmitted to the receiving apparatus.

8. The transmitting apparatus according to claim 7, further comprising:
    a compensation data size determining unit for determining size d (d≧0) of compensation dummy data added to the transmission data in accordance with the buffer setting of the relay server notified from the receiving apparatus; and
    the transmission data transmitting unit transmits the transmission data with compensation dummy data added thereto, and
    the compensation dummy data has the size d determined by the compensation data size determining unit.

9. The transmitting apparatus according to claim 8,
    wherein the compensation data size determining unit sets size d of the compensation dummy data to be zero, if the relay server has a buffer setting in which the quantity is zero.

10. The transmitting apparatus according to claim 8,
    wherein the transmission data transmitting unit transmits the transmission data with compensation dummy added thereto only once, if the relay server has a buffer setting in which the quantity is one.

11. The transmitting apparatus according to claim 8,
    wherein the transmission data transmitting unit transmits the transmission data with compensation dummy data added thereto each time, if the relay server has a buffer setting in which the quantity is equal to a quantity of instances that the relay server transmits the transmission data.

12. The transmitting apparatus according to claim 7,
    wherein the dummy data transmitting unit dynamically changes N each time the dummy data of n bytes (n≧1) and dummy data of N bytes (N≧n) is sequentially and repetitively transmitted.

13. The transmitting apparatus according to claim 8,
    further comprising a storing unit for storing a buffer setting of the relay server received from the receiving apparatus,
    wherein the compensation data size determining unit determines size of compensation dummy data in accordance with the buffer setting stored in the storing unit,
    and the transmission data transmitting unit adds compensation dummy data to the transmission data.

14. The transmitting apparatus according to claim 7, further comprising a detecting unit for detecting that a relay server for relaying communication between the transmitting apparatus and the receiving apparatus is changed, wherein the dummy data of n bytes and the dummy data of N bytes is transmitted based on a detection result of the detecting unit.

15. The transmitting apparatus according to claim 14, wherein the detecting unit detects that the relay server is changed using, as a trigger, UP/DOWN of a network interface of the transmitting apparatus or a change of an IP address of the transmitting apparatus.

16. A communication system including a transmitting apparatus comprising a dummy data transmitting unit for transmitting dummy data of n bytes ($n \geq 1$) and dummy data of N bytes ($N \geq n$) sequentially and repetitively to a relay server,
wherein the relay server transmits relayed dummy data to a receiving apparatus, the relayed dummy data being obtained by relaying, in conformity to a buffer setting, the dummy data of n bytes and/or the dummy data of N bytes received from the transmitting apparatus, and
the receiving apparatus includes:
- a relayed dummy data receiving unit for receiving the relayed dummy data from the relay server;
- a transmission data receiving unit for receiving transmission data transmitted by the relay server; and
- a buffer setting detecting unit for detecting a buffer setting of the relay server based on a first size value indicative of data size of relayed dummy data received for the first time by the relayed dummy data receiving unit and a second size value indicative of not larger data size of relayed dummy data received for the second time and relayed dummy data received for the third time;

wherein the buffer setting indicates a quantity of instances that the relay server buffers a predetermined amount of the transmission data transmitted to the transmission data receiving unit.

17. A method of detecting a buffer setting of a relay server for relaying communication between a transmitting apparatus and a receiving apparatus, comprising the steps of:
- transmitting dummy data of n bytes ($n \geq 1$) and dummy data of N bytes ($N \geq n$) sequentially and repetitively to the relay server by the transmitting apparatus;
- transmitting relayed dummy data obtained by relaying, based on a buffer setting, the dummy data of n bytes and/or the dummy data of N bytes received from the transmitting apparatus;
- receiving the relayed dummy data from the relay server by the receiving apparatus;
- receiving, by the receiving apparatus, transmission data transmitted by relay server; and
- detecting a buffer setting of the relay server based on a first size value indicative of data size of relayed dummy data received for the first time and a second size value indicative of not larger data size of relayed dummy data received for the second time and relayed dummy data received for the third time;

wherein the buffer setting indicates a quantity of instances that the relay server buffers a predetermined amount of the transmission data transmitted to the receiving apparatus

* * * * *